(12) United States Patent
Kimura et al.

(10) Patent No.: US 8,113,432 B2
(45) Date of Patent: Feb. 14, 2012

(54) APPARATUS FOR RECOGNIZING AN OPTICAL RECOGNITION CODE IN WHICH A CODE SYMBOL OF A 1-DIMENSIONAL COLOR BIT CODE INDICATIVE OF CERTAIN DATA IS DIVIDED INTO A PLURALITY OF CODE SYMBOLS

(75) Inventors: Akiteru Kimura, Tokyo (JP); Masayuki Matsuda, Kokubunji (JP); Kunio Kando, Tokyo (JP)

(73) Assignee: B-Core Inc., Tokyo (JP)

( * ) Notice: Subject to any disclaimer, the term of this patent is extended or adjusted under 35 U.S.C. 154(b) by 271 days.

(21) Appl. No.: 12/308,938

(22) PCT Filed: Jul. 18, 2007

(86) PCT No.: PCT/JP2007/064167
§ 371 (c)(1),
(2), (4) Date: Dec. 30, 2008

(87) PCT Pub. No.: WO2008/010513
PCT Pub. Date: Jan. 24, 2008

(65) Prior Publication Data
US 2009/0314838 A1    Dec. 24, 2009

(30) Foreign Application Priority Data

Jul. 19, 2006 (JP) ................. 2006-196548
May 16, 2007 (JP) ................. 2007-130504
Jun. 20, 2007 (JP) ................. 2007-163094

(51) Int. Cl.
*G06K 7/12* (2006.01)
*G06K 19/06* (2006.01)

(52) U.S. Cl. .................. 235/469; 235/494
(58) Field of Classification Search ......... 235/462.04, 235/469, 494; 382/162, 164, 165
See application file for complete search history.

(56) References Cited

U.S. PATENT DOCUMENTS

| 3,767,912 A | 10/1973 | Faux, Sr. |
| 3,810,423 A | 5/1974 | Hansen et al. |
| 6,070,805 A | 6/2000 | Kaufman et al. |

(Continued)

FOREIGN PATENT DOCUMENTS

CN    1434957 A    8/2003

(Continued)

OTHER PUBLICATIONS

European Search Report issued Apr. 22, 2010 in European Patent Application No. 10 15 2755.

(Continued)

*Primary Examiner* — Michael G Lee
*Assistant Examiner* — Suezu Ellis
(74) *Attorney, Agent, or Firm* — Oliff & Berridge, PLC

(57) ABSTRACT

It is possible to linearly arrange cells and indicate particular data in the order of colors of respective sells. A code system uses an optical symbol decoding method capable of reading the color arrangement if the arrangement continuity and the linear shape are maintained. The data expression method may be other than "the order of colors." For example, it is possible to employ a method for allocating a numeric value to each of the colors by one-to-one correspondence (R=0, B=1, etc.), a method for allocating data by a color transition ("CM"="MY"="YC"=0, "CY"="YM"="MC"=1, etc.), a method for allocating data for a combination of colors, and the like.

26 Claims, 26 Drawing Sheets

U.S. PATENT DOCUMENTS

| | | | |
|---|---|---|---|
| 6,283,647 B1 | 9/2001 | Konishi et al. | |
| 6,981,644 B2 * | 1/2006 | Cheong et al. | 235/462.04 |
| 7,020,327 B2 * | 3/2006 | Tack-don et al. | 382/162 |
| 7,185,816 B1 * | 3/2007 | Shoobridge | 235/462.04 |
| 7,438,232 B2 * | 10/2008 | Uchiyama | 235/462.1 |
| 7,478,746 B2 * | 1/2009 | Cattrone | 235/10 |
| 2002/0028015 A1 | 3/2002 | Tack-don et al. | |
| 2002/0066786 A1 | 6/2002 | Saito | |
| 2003/0201325 A1 | 10/2003 | Saito | |
| 2005/0011955 A1 | 1/2005 | Saito | |
| 2005/0023354 A1 | 2/2005 | Sali et al. | |
| 2008/0018731 A1 * | 1/2008 | Era | 348/51 |
| 2009/0194596 A1 * | 8/2009 | Kimura et al. | 235/469 |

FOREIGN PATENT DOCUMENTS

| | | |
|---|---|---|
| JP | A-63-255783 | 10/1988 |
| JP | A-5-333779 | 12/1993 |
| JP | A-6-4700 | 1/1994 |
| JP | A-49-53731 | 5/1994 |
| JP | A-7-271934 | 10/1995 |
| JP | A-8-185463 | 7/1996 |
| JP | A-8-300827 | 11/1996 |
| JP | A-8-305785 | 11/1996 |
| JP | A-11-161757 | 6/1999 |
| JP | A-2000-249518 | 9/2000 |
| JP | A-2002-334297 | 11/2002 |
| JP | A-2002-342702 | 11/2002 |
| JP | A-2003-36416 | 2/2003 |
| JP | A-2003-178277 | 6/2003 |
| JP | A-2004-326582 | 11/2004 |
| JP | A-2005-193578 | 7/2005 |
| JP | A-2005-266907 | 9/2005 |
| JP | A-2006-95586 | 4/2006 |
| RU | 2251734 C2 | 6/2004 |
| WO | WO 98/45799 | 10/1998 |
| WO | WO 01/86582 A1 | 11/2001 |
| WO | WO 2005/086496 A1 | 9/2005 |
| WO | WO 2005086496 A1 * | 9/2005 |

OTHER PUBLICATIONS

Extended European Search Report dated Jul. 30, 2010 issued in European Patent Application No. 10 15 2755.

Oct. 28, 2009 Search Report issued in European Patent Application No. EP 07 80 5867.

May 3, 2011 Communication in copending EPO Application No. 10 152 755.4.

May 6, 2011 Official Action in Russian Application No. 2009105657/08 with English translation.

Jan. 27, 2011 Office Action in copending Chinese Application No. 200780034839.5 with English translation.

* cited by examiner

FIG. 9

APPARATUS FOR RECOGNIZING AN OPTICAL RECOGNITION CODE IN WHICH A CODE SYMBOL OF A 1-DIMENSIONAL COLOR BIT CODE INDICATIVE OF CERTAIN DATA IS DIVIDED INTO A PLURALITY OF CODE SYMBOLS

TECHNICAL FIELD

The present invention relates to an optical code to be attached to an item for information processing. More particularly, the invention relates to an optical symbol used in the optical code, a method of attaching the optical symbol to an item, and a decoding method.

The invention further relates to an optical recognition code. More particularly, the invention relates to an optical recognition code reading technique (symbol cutout technique).

The invention also relates to an optical recognition code. More particularly, the invention relates to an efficient data restoring method for an optical recognition code called a 1D color bit code (Japanese Patent Application No. 2006-196705) proposed by the inventors of the present invention. The invention also provides a specification suitable for efficient data restoration. That is, the present invention also relates to a coding technique of an optical recognition code.

BACKGROUND ARTS

"Background Art 1"

Various symbols which are attached to items to be optically read for information processing are used. For example, a so-called barcode that records information by black and white patterns in one-dimensional direction is used since a long time ago.

Optical Code Using Colors

As optical codes, codes using chromatic colors such as red and blue (for convenience, such codes using chromatic colors will be called color codes herein) other than black and white are also widely proposed.

Normally, in an optical code (system) using colors (using chromatic colors), when a change occurs in detection of colors in a reader, the possibility that corresponding data also changes is higher than that in a black-and-white code. There is consequently a problem that the optical code using colors is susceptible to deterioration in color, printing unevenness, illumination light, and the like.

Conventional Patent Prior Arts

For example, the patent document 1 mentioned below discloses a barcode using three colors. The barcode is constructed so that "1" is expressed when the colors are shifted in a first order, and "0" is expressed when the colors are shifted in a second order.

The patent document 2 mentioned below discloses a code realizing increased data capacity by setting the color density of each of three primary colors in a plurality of tones.

The patent document 3 mentioned below discloses a two-dimensional code in which information is divided into pre-determined bit sequences according to printing capacity of a printer, and a color is selected and recorded for each of the divided bit sequences, a method of generating the two-dimensional code, and a restoring method.

The patent document 4 mentioned below discloses a code which can be used as a colored barcode as well as a general black-and-white barcode.

"Background Art 2"

The applicant of the present invention has proposed an optical recognition code expressing information by a shift and a change in colors in Japanese Patent Application No. 2006-196705 mentioned above. The optical recognition code is called a "1D color bit code". In the 1D color bit code, since restrictions on the size and shape of an area occupied by each of the colors are loose, the optical recognition code can be marked even on a rough surface or a soft material.

However, since the size and shape of an area occupied by a predetermined color are not constant, it is difficult for the conventional reading technique to handle such a 1D color bit code.

Conventional Barcode Reading Techniques

On the other hand, a so-called two-dimensional barcode is conventionally known. Generally, the two-dimensional barcode expresses data by black and white (light and dark) in segments whose positions are defined in a grid. Usually, a "marking pattern" (which refers to the pattern of the two-dimensional barcode including quiet zones for indicating boundaries) is integrated with "a marked object" as an object subject to marking. Generally, the marking pattern is integrated in the surface of the marked object by printing or the like.

When capture (capture of data as two-dimensional image data by an area sensor or the like) is optically performed to read the two-dimensional barcode, naturally, a part of the "marked object" is also captured (together with the two-dimensional barcode).

Even in the case where only the "marking pattern" floats in the air (such as the case where the marked object to be marked is a transparent one, or the two-dimensional barcode is hung by a string or the like), it is usually unavoidable that a background is captured together with the marking pattern.

Herein, an entered image other than the "marking pattern" in this case is referred to as a "background image". The input image of the "marking pattern" is referred to as a "marking image".

To decode the "marking image", it is clearly necessary as the first steps:

to distinguish the "marking image" and the "background image" from each other, and to recognize an accurate range of the "marking image".

Such operations are usually called "cutout" of the "marking image". In the case of a conventional two-dimensional barcode, the following procedures are taken. A plurality of specific patterns (usually called "cutout marks") is found by image recognition from an image captured by the area sensor. Based on the sizes of the "cutout marks" and the positional relations between them, a two-dimensional code existing range is estimated. Specifically, the range and the dimension of the pattern of the two-dimensional barcode are estimated, and the range is segmented. From data read from each of the segments, the existence of the two-dimensional barcode in the segment is recognized.

On the other hand, a conventional one-dimensional barcode represents data by the thicknesses of black and white (dark and light) bars. Bars at both ends and quiet zones correspond to the "cutout marks" in a two-dimensional barcode.

However, in general specifications of a one-dimensional barcode, linear "scan lines" are assumed and the dark and light patterns on the line are read. Consequently, the concept of cutting out the marking pattern from the background does not exist.

In the one-dimensional barcode, it is actually important to align the "scan line" with the bars in the one-dimensional barcode.

This operation can be carried out in various manners.

Firstly, this can be carried out by visual observation of the operator. Secondly, this can be carried out by emitting a number of scan lines like a raster scan. In this method, a barcode is held over the range where the scan lines exist, scanned by the number of scan lines, and decoding is performed based on the scanning result.

Generally, the first or second method is commonly used.

Therefore, the idea of "cutout" in the one-dimensional barcode is handy as compared with the two-dimensional barcode. On the other hand, a predetermined width (length of thick and thin bars) is necessary for the "marking pattern" in the barcode, and when the thickness is extremely small or large or in the case where arranged bars are curved, it is very difficult to perform decoding.

Conventional Patent Prior Arts

For example, the patent document 5 mentioned below discloses a cutout method capable of easily cutting out a barcode from characters and a figure.

The patent document 6 mentioned below discloses a method of printing a barcode including much information in a small space. In particular, it is characterized in that a barcode which is cut out as a set of inferior arcs having a center angle θ.

The patent document 7 mentioned below discloses an apparatus for reading a two-dimensional barcode. In particular, it discloses a technique characterized in switching decoding means according to the quality of an image.

Further, the patent document 8 mentioned below discloses a barcode cutout method capable of reading a plurality of bar codes. According to the technique disclosed here, even if left and right margins are nonstandard, they can be recognized continuously, and thus a plurality of barcodes can be cut out.

"Background Art 3"

As desCribed above, the applicant of the present invention proposed an optical recognition code representing information according to a shift and a change in colors in Japanese Patent Application No. 2006-196705 mentioned above. The optical recognition code is called a "1D color bit code".

The 1D color bit code has a structure of returning a digital value determined by a sequence of a plurality of colors (signal colors). The basic specification is a lined sequence (code symbol) of colors (signal colors).

Therefore, as the amount of data represented increases, the code symbol becomes long. As a result, the possibility that an entire single code symbol cannot be captured at once increases.

In some cases, a concrete single optical recognition code which is a geometric figure and represents predetermined data is particularly called a "code symbol" (or simply "symbol"). The concrete code symbol is captured by a CCD camera or the like, and a predetermined image processing is performed to restore original data.

Cases where a code symbol cannot be included within the field of view of an image of a camera and where a part of a code symbol is covered are actually assumed. In such cases, since the code symbol cannot be captured in a single screen, it is difficult to restore data. Therefore, it is necessary for the operator to carefully capture data.

A general black and white barcode based on the concept of stitching is known. In the case where data is read partially, not entirely, a plurality of pieces of partially read data is captured and stitched to restore data of an originally single barcode (that is, an entire single code symbol).

Such a stitching technique is applied to reading by a raster scan and reading of a stacked two-dimensional barcode. In the readings, data is stitched largely based on a peculiar pattern indicative of an end point or the center. FIG. 26 shows a state of stitching.

FIG. 26 shows an example of a barcode 3010 using general black and white bars. Scan lines are drawn on the barcode. It can be easily understood that a scan line 3012 scans only an upper left part of the code symbol, and thus only a part of the left side of the code symbol is obtained. On the other hand, it can be easily understood that a scan line 3014 scans only a lower right part of the code symbol, and thus only a part of the right side of the code symbol is obtained.

Obviously, in such a case, by stitching the data captured by the scans of the two scan lines 3012 and 3014, the single complete code symbol 3010 can be captured. Consequently, the technique is widely used.

In such a stitching technique, the pattern of a partial code captured is read, and it is determined which part is read. Based on the determination, stitching is performed. Therefore, the pattern of the barcode has to have some redundancy.

It can be considered that the stitching based on such redundancy can also be applied to a 1D color bit code to improve reading precision.

Definition of 1D Color Bit Code

Definition of the 1D color bit code devised by the inventors of the present invention will now be described. The 1D color bit code is defined as follows:

The 1D color bit code is "cells" as predetermined color areas which are arranged in a line (="cell sequence");

A plurality of colors is used, and a color is assigned to each cell;

The cells do not include each other. That is, a cell is not included in another cell;

The number of cells constituting a sequence is a predetermined number; and

The same color is not assigned to neighboring cells, but different colors are always assigned.

A 1D color bit code is generated basically based on these conditions.

Obviously, the number of cells, the kinds of colors actually used and the like vary depending on applications.

Conventional Patent Prior Arts

Now, some conventional patent prior arts will be described.

For example, the patent document 9 mentioned below discloses a technique of printing an ID code by a 4-state bar and printing a local code by a barcode according to the bar-no-bar method, thereby preventing missing in the printing.

The patent document 10 mentioned below discloses a technique capable of reading a barcode even when an object captured by a CCD camera is faded or the barcode has a missing part.

The patent documents 8 and 11 mentioned below disclose a thermosensitive recording member which includes a thermosensitive color layer containing a color compound having near-infrared absorption performance and in which a color pattern is a Calra code. It is described that even if an automatically recognized code has some missing part, it can be read.

Patent Document 1:

Japanese Patent Application Laid-Open No. S63-255783 (Patent No. 2521088)

Patent Document 2

Japanese Patent Application Laid-Open No. 2002-342702

Patent Document 3

Japanese Patent Application Laid-Open No. 2003-178277

Patent Document 4

Japanese Patent Application Laid-Open No. 2004-326582

Patent Document 5
　　Japanese Patent Application Laid-Open No. 2005-266907
Patent Document 6
　　Japanese Patent Application Laid-Open No. 2005-193578
Patent Document 7
　　Japanese Patent Application Laid-Open No. H08-305785
Patent Document 8
　　Japanese Patent Application Laid-Open No. H08-185463
Patent Document 9
　　Japanese Patent Application Laid-Open No. 2006-095586
Patent Document 10
　　Japanese Patent Application Laid-Open No. 2000-249518
Patent Document 11
　　Japanese Patent Application Laid-Open No. H08-300827

DISCLOSURE OF THE INVENTION

Problems to be Solved by the Invention

"Problem 1"

As described above, a so-called one-dimensional barcode is widely practically used as a code system in which codes are arranged one-dimensionally. Although a number of kinds of one-dimensional barcodes exist, they have a code system of encoding an image using variations in the widths of black and white (dark and light) patterns which alternately appear. It is understood that a two-dimensional barcode has a similar concept when the "width" is replaced with "cell position".

Usually, a barcode is printed directly on paper or a product. Therefore, if the above concept can be carried out as it is, there is no problem.

However, in circumstances that a barcode can be printed only to a distortable item or can be printed inaccurately, a method relying on the widths of bars cannot be always said to be a proper method. In such a case, although there is a need for attaching an ID, the user has to give up the method in not a few cases due to the above-described problem.

On the other hand, as described above, a number of so-called color barcodes are conventionally proposed. However, most of the conventional color barcodes are directed to increase the density of data. Barcodes which realize an increased number of colors and densities to increase data density but result in lack in practicality are found here and there.

In the field of the conventional black and white barcode, the conventional techniques are used as they are, and proposals to solve the problems are hardly known. This may be due to circumstances that the method of attaching a seal on which a barcode is printed to an item is commonly used and a barcode is hardly directly printed on a distortable item.

However, the method of attaching a seal has the possibility of allowing illicit behavior such as re-attaching a seal or replacing with another seal. Consequently, a code which can be printed directly on an item is desirable.

The present invention has been achieved in view of such problems, and an object of the invention is to propose a novel barcode which does not depend on the width of a barcode and to provide a code using an optical symbol which can be read at high precision even in a situation that a code is printed on a distortable item or printing precision is not high.

"Problem 2"

The name of the above-described 1D color bit code includes "1D" (one-dimensional). However, it may be more appropriate to describe the present invention in comparison with a conventional two-dimensional barcode, for a two-dimensional image of an area sensor is used and the thickness and bending of a "marking pattern" are allowed. In the following, the description will be given with appropriate comparison with the conventional two-dimensional barcode.

The conventional two-dimensional barcode cutout method has been described above. However, the method has a major technical problem that cutout cannot be performed if a cutout pattern cannot be recognized accurately.

Specifically, the two-dimensional barcode has the following features:

If the precondition that a two-dimensional barcode is arranged on a plane is not satisfied, basically, the two-dimensional barcode cannot be accurately recognized. A reading algorithm on a precondition that an error occurs to some extent is needed.

An operation for finding a specific pattern of a "cutout mark" has to be performed in the state where there is a complicated "background pattern".

Therefore, estimation of a distortion of a cutout mark, estimation of the size, allowance in the case where the plane is curved, and the like have to be performed by distinguishing the cutout mark from various background patterns. If those processes are fully performed, the process amount is enormous.

In practice, ancillary operations such as enlarging the area occupied by the "marking image" in the entire screen, and adjusting the position (performs positioning) of the "marking image" in the screen to some extent by a user are required.

In the case where a plurality of barcodes exists in an image, the processes and positioning are more complicated and higher precision is required. There is consequently a problem that it is very difficult to realize it. That is, in practice, it has to be assumed that only one two-dimensional barcode exists in one image.

However, the 1D color bit code devised by the inventors of the present invention is a code in which only arrangement of colors is to be recognized and is resistive to distortion, blurring, variations, and the like in the dimension and shape. Naturally, for reading, a color bit code has to be cut out from an image in which the color bit code is captured together with the background by an area sensor or the like.

An object of the present invention is to provide an easier cutout method utilizing advantages of a 1D color bit code devised by the inventors of the present invention, resistive to distortion, blurring, variations, and the like in the dimension and shape, and different from that of a conventional two-dimensional barcode.

Another object of the present invention is to propose a cutout method capable of easily cutting out a 1D color bit code even when a plurality of 1D color bit codes exist in an image.

"Problem 3"

(1) Further, since a 1D color bit code is a code obtained by combining a plurality of kinds of colors (for example, three kinds), it is very difficult to generate a peculiar pattern if extreme redundancy is not given. However, extreme redundancy causes increase in the length of a color sequence, and thus it is difficult to employ the code in practice.

One of the characteristics of the 1D color bit code is that a plurality of code symbols can be easily read at the same time.

Consequently, the inventors of the present invention have developed a code reading technique capable of obtaining the same or better operations and effects than those of the conventional stitching by a method of dividing a code symbol indicative of a piece of data into a plurality of symbols and marking the symbols, which is different from the idea of conventional stitching.

That is, an object of the present invention is to provide an optical recognition code with improved reading precision by dividing a code symbol of a 1D color bit code indicative of certain data into a plurality of code symbols and marking the divided code symbols.

(2) Another object of the present invention is to provide a technique, in a state where a plurality of code symbols of different numbers of cells mixedly exist and when an end of a code symbol is missing in the read data of the code symbol, capable of detecting the missing in reading and preventing erroneous reading.

Means for Solving the Problems

"Means 1"

The present invention proposes the following code to achieve the objects.

In a code of the present invention, cells are arranged linearly, and specific data is indicated by an order of colors of the cells. The present invention proposes a code system which can be read when continuity of the color sequence and the linear form (topology) are maintained.

As the method of representing data, not only "order of colors" but also various methods can be employed such as a method of assigning one numerical value to each one color (for example, R=0, B=1, . . . ), a method of assigning data to shift of colors ("CM"="MY"="YC"=0, "CY"="YM"="MC"=1, . . . ), and a method of assigning data to combinations of colors.

Herein, "linear" refers to a state where cells are arranged in a line without being branched or crossed. As long as the cells are lined, the line may be straight, curved, or bent.

Description of Terms

Terms in the specification will be briefly described.

First, in the specification, an item to which an optical symbol is attached may be any corporeal thing. It may not be necessarily a rigid member but may be a soft item such as food. As will be described later, the present invention proposes an optical symbol resistive to distortion and deformation of an item. A soft item such as clothes is also included in the "item" in the specification.

A container and package of an item are also included in the "item". Further, a flat- or plate-shaped item such as sheet of paper is also included in the "item" in the specification.

In the specification, the following terms are also used:
Code: A code is a standard for expressing data in a symbol. To clarify that the code is a standard, the code may also be referred to as a code system.
Symbol: A symbol is obtained by converting data based on the standard. For example, in a typical barcode, each of "black and white patterns" obtained by converting data based on the "standard" called "barcode" is called a symbol or a "barcode symbol".
Decoding: A process of obtaining original data from each of symbols based on the code is called decoding.
Reader: A reader is an apparatus for reading a symbol attached to an item. The read data is subject to the decoding. As a result of decoding, original data is obtained.
Data: Data is an object to be converted to a symbol. Data is typically numerical data, but may be character data or digital data made of 0 and 1.

Specifically, the present invention employs the following means.

(1) To solve the problems, the present invention provides an optical symbol including a plurality of cells arranged linearly, each cell being an area to which one color selected from a group of "n" colors is assigned, where "n" is an integer of 3 or greater.

(2) According to the invention, in the optical symbol of (1), the cells are arranged continuously without being branched or crossed, and the colors of neighboring cells are different from each other.

(3) To solve the problems, the present invention provides an optical symbol including a plurality of cells arranged linearly, each cell being an area to which one color selected from a group of "n" colors is assigned, wherein end-point cells to which a color other than the "n" colors is assigned are provided at both ends of the linear arrangement, where "n" is an integer of 3 or greater.

With the colors, the start and end points can be identified.

(4) According to the invention, in the optical symbol of (1), in the optical symbol of (3), a color of a first neighboring cell as the cell neighboring to the end-point cell is a predetermined color which is determined in advance from the group of "n" colors.

With (the combination of) the colors, the start and end points can be identified.

(5) According to the invention, in the optical symbol of (4), a color of a second neighboring cell neighboring to the first neighboring cell is a predetermined color which is determined in advance from the group of "n" colors.

(6) According to the invention, in the optical symbol of (1), the "n" colors are assigned to a cell neighboring to the end-point cell or to a cell in a predetermined position near the end-point cell.

(7) The present invention provides an optical symbol decoding method of decoding the optical system of (6), wherein a color assigned to the neighboring cell or the cell in the predetermined position is used for calibration of the color of the cell.

(8) The present invention provides an optical symbol decoding method of decoding the optical system of (6), wherein a color assigned to the neighboring cell or the cell in the predetermined position is used for calibration of a color difference between the cells.

(9) According to the invention, the optical symbol decoding method of (7) or (8) includes a tracing step of tracing the cell included in an optical symbol. In the tracing step, the cell is traced based on a color difference between the color assigned to the end-point cell and the color assigned to the neighboring cell or the cell in the predetermined position.

(10) According to the invention, in the optical symbol of (3), the color assigned to the end-point cell or a similar color thereto is assigned to an area other than the cell arrangement.

(11) The present invention provides an item to which the optical symbol of (3) is attached wherein the color assigned to the end-point cell or a similar color thereto is assigned to an area other than the cell arrangement.

(12) According to the invention, in the item of (11), the color assigned to the end-point cell or a similar color thereto is an achromatic color such as black or gray.

(13) To solve the problems, the present invention also provides an optical symbol including a plurality of configuration cells arranged linearly, each configuration cell being an area to which one color selected from a group of "n" colors is assigned, wherein an end-point cell to which a color other than the "n" colors is assigned and the configuration cell appear alternately twice or more at both ends or at one end of the linear arrangement, where "n" is an integer of 3 or greater.

(14) According to the invention, in the optical symbol of (1), a sign indicated by the cell is determined by a relation between the cell and a color of a cell neighboring to the cell.

(15) According to the invention, in the optical symbol of (1), a check, a notation, and the like are distinguished from each other according to a manner of expressing the sign by the cell.

(16) According to the invention, in the optical symbol of (1), a color corresponding to an excessive light amount of a light source irradiating the optical symbol is not included in the group of "n" colors.

(17) The present invention provides an item to which the optical symbol according any one of (1) to (6) or any one of (13) to (16) is attached.

(18) The present invention provides a code system using the optical symbol according to any one of (1) to (6) or any one of (13) to (16).

(19) The present invention provides a method of decoding the optical symbol according to any one of (1) to (6) or any one of (13) to (16), including: a step of capturing the optical symbol and obtaining image data of the optical symbol; a step of retrieving end-point cells at a start point and an end point from the image data; a step of tracing a configuration cell provided between the two retrieved end-point cells at the start and end points based on the end-point cells; and a step of decoding the traced configuration cell.

(20) The present invention provides a method of attaching the optical symbol according to any one of (1) to (6) or any one of (13) to (16) to an item, including: a step of generating the optical symbol based on data to be recorded; and a step of attaching the generated optical symbol to a predetermined item. The attaching step includes any of a step of printing the optical symbol to the item, a step of attaching the optical symbol to an item by embroidery, and a step of attaching an adhesive seal on which the optical symbol is drawn.

"Means 2"

A. Apparatus

(21) To solve the problems, the present invention further provides an optical recognition code recognizing apparatus for recognizing an optical recognition code, including: dividing means for dividing image data obtained by imaging an optical recognition code into color areas based on parameters indicative of colors; and determining means for determining whether each of the divided color areas is a cell as a component of the optical recognition code or not.

(22) According to the present invention, in the optical recognition code recognizing apparatus of (21), the image data is constructed by data of three primary colors, and the parameters indicative of colors are data of the three primary colors.

The data of three primary colors are data expressing colors by, for example, an RGB format, an CMY format or the like.

(23) According to the invention, in the optical recognition code recognizing apparatus of (21), the image data is constructed by data indicative of a color including a hue, and a parameter indicative of a color is the hue.

The data indicative of a color including a hue is data indicative of a color by an HSV format, an HLS format or the like as well as the RGB format or the CMY format. As long as a hue appears, any form or format can be used. For example, in the case where a color is represented by a color difference signal or the like, the color difference signal or the like also corresponds to an example of data representing a color including a hue. Data other than so-called black and white data corresponds to an example of the data indicative of a color including a hue.

(24) According to the invention, in the optical recognition code recognizing apparatus of (21), the dividing means performs an area dividing process based on only the parameters indicative of colors without using any information on position, dimension, and shape of an area to be divided.

(25) According to the invention, in the optical recognition code recognizing apparatus of (21), the dividing means performs an imaging process of enlarging an area on each of the areas obtained by division.

(26) According to the invention, in the optical recognition code recognizing apparatus of (21), the dividing means performs an imaging process of reducing an area on each of the areas obtained by division.

(27) According to the invention, in the optical recognition code recognizing apparatus of (21), the dividing means converts the image data to four values or N values based on the parameters indicative of colors, and dividing the image data into color areas based on the values, where N is a positive integer.

(28) According to the invention, in the optical recognition code recognizing apparatus of (27), the determining means cuts out a pattern of a single 1D color bit code or a plurality of 1D color bit codes based on only an arrangement manner of the areas (boundary condition, the number of areas, and compatibility of arrangement order) from each of the areas obtained by the division.

(29) According to the invention, in the optical recognition code recognizing apparatus of (21), the dividing means divides the image data into an area of one or more colors constructing a marking pattern and an area of a color indicative of a quiet zone, and the color indicative of the quiet zone is a color (space color) other than the colors constructing the marking pattern.

(30) According to the invention, in the optical recognition code recognizing apparatus of (29), when a target area satisfies any of the following conditions, the determining means determines that the target area is a candidate of a cell as a component of a color bit code:

[ ]

(Intermediate cell condition "a") Other four areas are neighboring around the target area, and colors of the other four areas are "space color-another color-space color-another color" in the circumferential direction around the target area as a center, and (End cell condition "b") Two other areas are neighboring around the target area, and colors of the other two areas are a space color and another color.

The another color is another color as a component of the marking pattern, different from the color of the target area.

(31) According to the invention, in the optical recognition code recognizing apparatus of (29) or (30), the space color indicating the quiet zone is white or black.

(32) According to the invention, in the optical recognition code recognizing apparatus of (21), when the number of cells constructing a 1D color bit code in the case where a target area is assumed to be a cell as a component of the 1D color bit code coincides with a predetermined number, the determining means determines that the target area is a candidate of a cell as a component of a color bit code.

(33) According to the invention, in the optical recognition code recognizing apparatus of (21), when a start point and an end point of a 1D color bit code are detected and one or more cells constructing the start point and one or more cells constructing the end point coincide with predetermined colors of the start and end points in the case where a target area is assumed to be a cell as a component of the 1D color bit code, the determining means determines that the target area is a candidate of a cell as a component of a color bit code.

(34) According to the invention, in the optical recognition code recognizing apparatus of (21), when an intermediate point of a 1D color bit code is detected and one or more cells constructing the intermediate point coincide with a predetermined color of the intermediate point in the case where a target area is assumed to be a cell as a component of the 1D color bit code, the determining means determines that the target area is a candidate of a cell as a component of a color bit code.

(35) According to the invention, in the optical recognition code recognizing apparatus of any of (30) to (33), the determining means regards, as a color bit code, a group of color areas estimated as a color bit code made of candidates of cells constructing a color bit code, and decodes the color bit code to obtain original data.

(36) According to the invention, in the optical recognition code recognizing apparatus of (35), when a plurality of groups of color areas estimated as color bit codes each made of candidates of cells constructing a color bit code exist, the determining means decodes each of the groups of areas as a color bit code and decode each color bit code to obtain original data.

B. Program

(37) To solve the problems, the present invention provides a program for making a computer operate as an optical recognition code recognizing apparatus for recognizing an optical recognition code, wherein the computer is made execute: a dividing procedure for dividing image data obtained by imaging an optical recognition code into color areas based on parameters indicative of colors; and a determining procedure for determining whether each of the divided color areas is a cell as a component of the optical recognition code or not.

(38) According to the invention, in the program of (37), the image data is constructed by data of three primary colors, and the parameters indicative of the colors are data of the three primary colors.

(39) According to the invention, in the program of (37), the image data is constructed by data indicative of a color including a hue, and a parameter indicative of a color is the hue.

(40) According to the invention, in the program of (37), in the dividing procedure, an area dividing process is performed based on only the parameters indicative of colors without using any information on position, dimension, and shape of an area to be divided.

(41) According to the invention, in the program of (37), in the dividing procedure, an imaging process of enlarging an area is executed on each of the areas obtained by division.

(42) According to the invention, in the program of (37), in the dividing procedure, an imaging process of reducing an area is executed on each of the areas obtained by division.

(43) According to the invention, in the program of (37), in the dividing procedure, the image data is converted to four values or N values based on the parameters indicative of colors, and the image data is divided into color areas based on the values, where N is a positive integer.

(44) According to the invention, in the program of (43), in the determining procedure, a pattern of a single 1D color bit code or a plurality of 1D color bit codes is cut out based on only an arrangement manner of the areas (boundary condition, the number of areas, and compatibility of arrangement order) from each of the areas obtained by the division.

(45) According to the invention, in the program of (37), in the dividing procedure, the image data is divided into an area of one or more colors constructing a marking pattern and an area of a color indicative of a quiet zone, and the color indicative of the quiet zone is a space color other than the colors constructing the marking pattern.

(46) According to the invention, in the program of (45), in the determining procedure, when a target area satisfies any of the following conditions, it is determined that the target area is a candidate of a cell as a component of a color bit code:

(Intermediate cell condition "a") Other four areas are neighboring around the target area, and colors of the other four areas are "space color-another color-space color-another color" in the circumferential direction around the target area as a center, and (End cell condition "b") Two other areas are neighboring around the target area, and colors of the other two areas are a space color and another color.

The another color is another color as a component of the marking pattern, different from the color of the target area.

(47) According to the invention, in the program of (45) or (46), the space color indicating the quiet zone is white or black.

(48) According to the invention, in the program of (37), in the determining procedure, when the number of cells constructing a 1D color bit code in the case where a target area is assumed to be a cell as a component of the 1D color bit code coincides with a predetermined number, it is determined that the target area is a candidate of a cell as a component of a color bit code.

(49) According to the invention, in the program of (37), in the determining procedure, when a start point and an end point of a 1D color bit code are detected and one or more cells constructing the start point and one or more cells constructing the end point coincide with predetermined colors of the start and end points in the case where a target area is assumed to be a cell as a component of the 1D color bit code, it is determined that the target area is a candidate of a cell as a component of a color bit code.

(50) According to the invention, in the program of (37), in the determining procedure, when an intermediate point of a 1D color bit code is detected and one or more cells constructing the intermediate point coincide with a predetermined color of the intermediate point in the case where a target area is assumed to be a cell as a component of the 1D color bit code, it is determined that the target area is a candidate of a cell as a component of a color bit code.

(51) According to the invention, in the program of any of (46) to (49), in the determining procedure, a group of color areas estimated as a color bit code made of candidates of cells constructing a color bit code is regarded as a color bit code and decoded to obtain original data.

(52) According to the invention, in the program of (51), in the determining procedure, when a plurality of groups of color areas estimated as color bit codes each made of candidates of cells constructing a color bit code exist, each of the area groups is regarded as a color bit code and decoded to obtain original data.

C. Methods

(53) To solve the problems, the present invention provides an optical recognition code recognizing method for recognizing an optical recognition code, including: a dividing step of dividing image data obtained by imaging an optical recognition code into color areas based on parameters indicative of colors; and a determining step of determining whether each of the divided color areas is a cell as a component of the optical recognition code or not.

(54) According to the invention, in the optical recognition code recognizing method of (53), the image data is constructed by data of three primary colors, and the parameter indicative of colors are data of the three primary colors.

(55) According to the invention, in the optical recognition code recognizing method of (53), the image data is constructed by data indicative of a color including a hue, and a parameter indicative of a color is the hue.

(56) According to the invention, in the optical recognition code recognizing method of (53), in the dividing step, an area dividing process is performed based on only the parameters indicative of colors without using any information on position, dimension, and shape of an area to be divided.

(57) According to the invention, in the optical recognition code recognizing method of (53), in the dividing step, an imaging process of enlarging an area is executed on each of the areas obtained by division.

(58) According to the invention, in the optical recognition code recognizing method of (53), in the dividing step, an imaging process of reducing an area is executed on each of the areas obtained by division.

(59) According to the invention, in the optical recognition code recognizing method of (53), in the dividing step, the image data is converted to four values or N values based on the parameters indicative of colors, and the image data is converted into color areas based on the values, where N is a positive integer.

(60) According to the invention, in the optical recognition code recognizing method of (59), in the determining step, a pattern of a single 1D color bit code or a plurality of 1D color bit codes is cut out based on only an arrangement manner of the areas (boundary condition, the number of areas, and compatibility of arrangement order) from each of the areas obtained by the division.

(61) According to the invention, in the optical recognition code recognizing method of (53), in the dividing step, the image data is divided into an area of one or more colors constructing a marking pattern and an area of a color indicative of a quiet zone, and the color indicative of the quiet zone is a space color other than the colors constructing the marking pattern.

(62) According to the invention, in the optical recognition code recognizing method of (61), in the determining step, when a target area satisfies any of the following conditions, it is determined that the target area is a candidate of a cell as a component of a color bit code:

(Intermediate cell condition "a") Other four areas are neighboring around the target area, and colors of the other four areas are "space color-another color-space color-another color" in the circumferential direction around the target area as a center, and (End cell condition "b") Two other areas are neighboring around the target area, and colors of the other two areas are a space color and another color.

The another color is another color as a component of the marking pattern, different from the color of the target area.

(63) According to the invention, in the optical recognition code recognizing method of (61) or (62), the space color indicating the quiet zone is white or black.

(64) According to the invention, in the optical recognition code recognizing method of (53), in the determining step, when the number of cells constructing a 1D color bit code in the case where a target area is assumed to be a cell as a component of the 1D color bit code coincides with a predetermined number, it is determined that the target area is a candidate of a cell as a component of a color bit code.

(65) According to the invention, in the optical recognition code recognizing method of (53), in the determining step, when a start point and an end point of a 1D color bit code are detected and one or more cells constructing the start point and one or more cells constructing the end point coincide with predetermined colors of the start and end points in the case where a target area is assumed to be a cell as a component of the 1D color bit code, it is determined that the target area is a candidate of a cell as a component of a color bit code.

(66) According to the invention, in the optical recognition code recognizing method of (53), when an intermediate point of a 1D color bit code is detected and one or more cells constructing the intermediate point coincide with a predetermined color of the intermediate point in the case where a target area is assumed to be a cell as a component of the 1D color bit code, the determining means determines that the target area is a candidate of a cell as a component of a color bit code.

(67) According to the invention, in the optical recognition code recognizing method of any of (62) to (65), in the determining step, a group of color areas estimated as a color bit code made of candidates of cells constructing a color bit code is regarded as a color bit code and decoded to obtain original data.

(68) According to the invention, in the optical recognition code recognizing method of (67), in the determining step, when a plurality of groups of color areas estimated as color bit codes each made of candidates of cells constructing a color bit code exist, each of the groups of areas is regarded as a color bit code and decoded to obtain original data.

"Means 3"

(69) To solve the problems, the invention also provides an optical recognition code including a predetermined number of cells arranged linearly, each cell being a color area to which a predetermined color is assigned, wherein a range of the number of cells in a single code symbol is determined, and code symbols of different numbers of cells are allowed to be mixed as long as the numbers lie in the range.

(70) The present invention also provides an optical recognition code including a predetermined number of cells arranged linearly, each cell being a color area to which a predetermined color is assigned, wherein data to be expressed is expressed by using a plurality of code symbols.

(71) According to the invention, in the optical recognition code of (70), the plurality of code symbols has the same number of cells.

(72) According to the invention, in the optical recognition code of (70) or (71), each of the plurality of code symbols includes group identification data for identifying a group to which the plurality of code symbols belongs in order to show that the code symbol is included in the group of the plurality of code symbols indicative of predetermined data, and in-group order identification data indicative of an order of the code symbol in the group.

(73) According to the invention, in the optical recognition code of (72), the group identification data for identifying a group is data expressed by a predetermined group of cells in the code symbol.

(74) According to the invention, in the optical recognition code of (72), the group identification data for identifying a group is a color pattern expressed in a predetermined group of cells in the code symbol.

(75) According to the invention, in the optical recognition code of (72), the in-group order identification data is data expressed by a predetermined group of cells in the code symbol.

(76) According to the invention, in the optical recognition code of (72), the in-group order identification data is a color pattern expressed in a predetermined group of cells in the code symbol.

(77) According to the invention, in the optical recognition code of (69) or (70), a color sequence for end identification is provided at left and right ends in each of the code symbols to prevent erroneous reading due to a failure in reading of an end of the code symbol, and when the color sequence for end identification is partially read, a read failure can be detected.

(78) According to the invention, in the optical recognition code of (77), the number of cells constructing each of the code symbols is N or N−1, the number of colors used by each of the code symbols is three or more, and a cell of a first color is placed as the color sequence for end identification at one end of each of the code symbols, and a cell of a second color is placed as the color sequence for end identification at the other end, where N is a natural number and the first color and the second color are different from each other.

(79) According to the invention, in the optical recognition code of (77), the number of cells constructing each of the code symbols is N or N−1, the number of colors used by each of the code symbols is three or more, the color sequence for end identification provided at one end of each of the code symbols is constructed by, in an order from the one end, a cell of a first color and a cell of a second color, and the color sequence for end identification provided at the other end of each of the code symbols is constructed by, in an order from the other end, a cell of the first color and a cell of a third color. The first, second, and third colors are colors different from each other, and N is a natural number.

(80) According to the invention, in the optical recognition code of (77), the number of cells constructing each of the code symbols is N or less and N−k or greater, the number of colors used by each of the code symbols is three or more, the color sequence for end identification provided at one end of each of the code symbols is constructed by, in an order from the one end, a cell of a first color and a first repetitive cell part, the color sequence for end identification provided at the other end of each of the code symbols is constructed by, in an order from the other end, a cell of a second color and a second repetitive cell part, in the first repetitive cell part, a cell of a third color and a cell of the second color are alternately coupled from the one end side toward the inside of the code symbol, and the total number of cells coupled is k, and in the second repetitive cell part, a cell of the third color and a cell of the first color are alternately coupled from the other end side toward the inside of the code symbol, and the total number of cells coupled is k, where N is a natural number, and k is an integer of 1 or greater and less than N.

(81) According to the invention, in the optical recognition code of (77), the number of cells constructing each of the code symbols is N or less and N−k or greater, the number of colors used by each of the code symbols is three or more, the color sequence for end identification provided at one end of each of the code symbols is constructed by, in an order from the one end, a cell of a first color and a first repetitive cell part, the color sequence for end identification provided at the other end of each of the code symbols is constructed by, in an order from the other end, a cell of the first color and a second repetitive cell part, in the first repetitive cell part, a cell of a second color and a cell of a third color are alternately coupled from the one end side toward the inside of the code symbol, and the total number of cells coupled is k, and in the second repetitive cell part, a cell of the third color and a cell of the second color are alternately coupled from the other end side toward the inside of the code symbol, and the total number of cells coupled is k, where N is a natural number, and k is an integer of 1 or greater and less than N.

(82) The present invention also provides an item to which the optical recognition code of any of (69) to (81) is attached.

Effect of the Invention

"Effect 1"

According to the optical symbol of the present invention, the order of configuration cells can be specified by tracing configuration cells. Since data is expressed by combination of colors or the like of the configuration cells, a code system which does not exert an influence on reading of data even when the size of the configuration cell changes is obtained.

Since flexibility of the relative positional relation among groups of cells constructing a symbol is high, the symbol can be used also for an item whose surface is soft.

For example, a symbol can be directly printed on food such as soft meat by using food colorants. A symbol can be also directly printed on cloth and a soft item.

In a conventional optical barcode, a symbol is attached to an item by a process of affixing a seal or the like, and there is not a little possibility that data is falsified by replacing with another seal or the like. In contrast, according to the present invention, a symbol can be directly printed even on a soft item. Therefore, it is significantly difficult to replace the symbol with another symbol. As a result, according to the invention, data falsification can be prevented.

In the optical symbol and the code system using the optical symbol according to the invention, a symbol is constructed by linearly arranging a plurality of cells. As long as the symbol is linear, it may be straight or curved. Therefore, a symbol having flexibility in design can be obtained.

"Effect 2"

As described above, in the present invention, a group of cells satisfying the conditions of a "marking pattern" of the 1D color bit code in the entire image data is extracted from the "background image" based on the characteristics. Therefore, a code can be recognized without using an auxiliary sign such as a "cutout mark" like in a conventional two-dimensional barcode.

Therefore, a process and means for finding a cutout mark do not exist in the prevent invention. By processing entire image data by a predetermined method, a pattern corresponding to a "marking pattern" is recognized.

It is unnecessary to perform complicated image recognition for cutout like in the conventional two-dimensional barcode. A simple imaging process and image recognizing process and a higher processing speed can be achieved.

Further, the symbol is recognized by a pattern of the entire image data. Consequently, a precise image and a complicated process for finding a cutout mark and performing positioning are unnecessary. A simple image capture and image processing operation can be achieved.

At the same time, a simple configuration can be used for a reading device, software for an imaging process and an electric circuit (such as a storing device) in which software is stored. Consequently, as compared with the conventional technique, lower price and smaller size can be realized.

An optical recognition code can be realized with low precision of marking (operation and action of assigning an optical recognition code).

According to the present invention, even when a plurality of 1D color bit codes exist in a single image, a group of all of areas matching a condition are recognized as 1D color bit codes without taking special means, and original data is obtained. Therefore, even in the case of using a plurality of 1D color bit codes, a simple reading operation like in the case where a single 1D color bit code is used can be applied.

"Effect 3"

Further, as described above, according to the invention, predetermined data can be expressed by using a plurality of code symbols. Even in the case where there are variations in the numbers of cells in a plurality of code symbols, failure in reading (missing in an end part) at the time of reading can be detected by providing a color sequence for identifying an end, and erroneous reading can be prevented.

According to the present invention, in a state that code symbols of different numbers of cells are allowed to mixedly exist, occurrence of failure in reading (missing in an end part) can be detected. An optical recognition code capable of preventing erroneous reading can thus be obtained.

In an item to which such an optical recognition code is attached, predetermined data can be expressed by a plurality of code symbols.

In an item to which such an optical recognition code is attached, even when a plurality of code symbols having different numbers of cells mixedly exist, failure in reading (missing) in an end part can be grasped more efficiently, and erroneous reading can be prevented.

BRIEF DESCRIPTION OF DRAWINGS

FIG. 9 is an explanatory diagram showing an example of preparing different conversion tables for digits.

Figure 1:
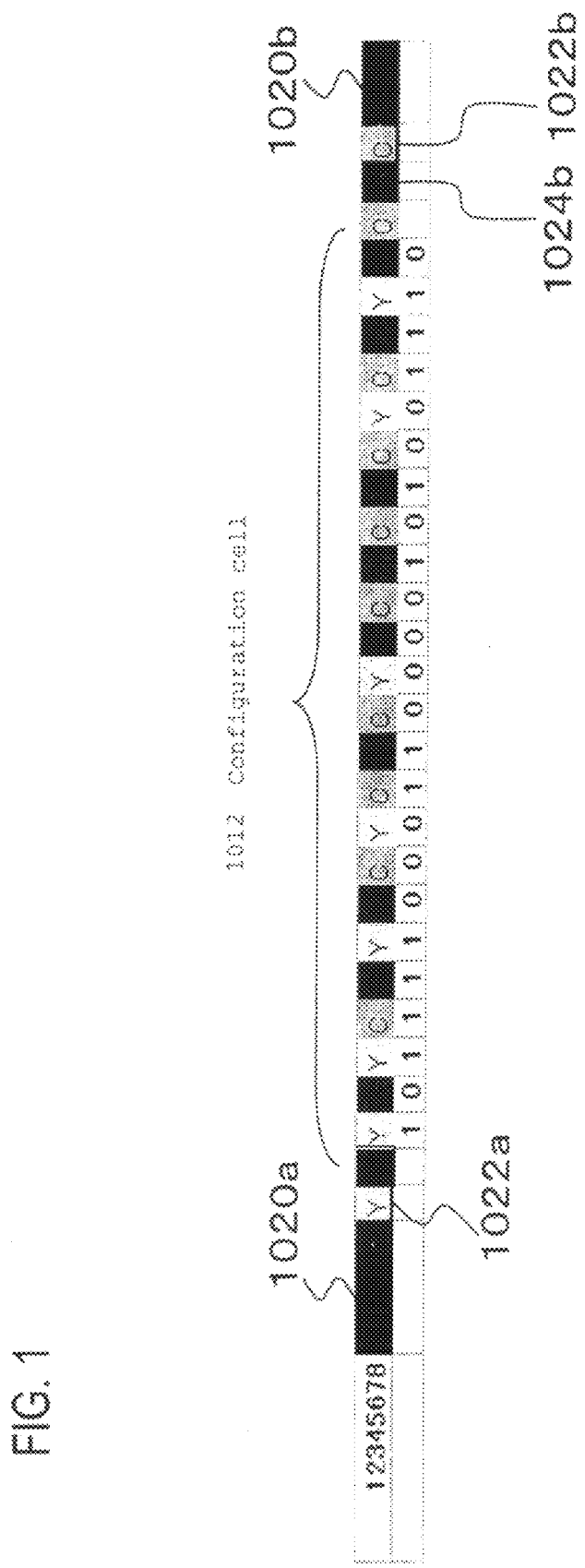
FIG. 1 is an explanatory diagram of an optical symbol in a first embodiment.

DESCRIPTION OF REFERENCE NUMERALS 1010 optical symbol
1012 cell (configuration cell)
1020 end-point cell
1022 directly neighboring cell
1024 indirectly neighboring cell
1030 space cell
1032 cell for calibration
R red
B blue
Y yellow
W white
3010 barcode
3012, 3014 scan lines
3020 code symbol
3030 code symbol
3040 code symbol
3042 group pattern part
3044 in-group order display pattern part
3050 code symbol
3060 code symbol
3062 in-group order display pattern part

BEST MODE FOR CARRYING OUT THE INVENTION

First Embodiment

A preferred embodiment of the present invention will be described hereinbelow with reference to FIG. 12.

In this embodiment, a code using an optical symbol having a form in which cells are placed linearly. The optical symbol is a symbol in a plane shape and is attached to various items.

Cell (Configuration Cell) and End-Point Cell

An optical symbol of this embodiment is constructed by cells and end-point cells. A cell is a range/area to which a single color is assigned and can be formed in various shapes such as circle, square, triangle, and the like. An optical symbol is formed by arranging these cells linearly.

The end-point cell is a cell positioned at an end point of an optical symbol made by a group of cells connected linearly. In this embodiment, the end-point cell is an area/range to which a color different from the color assigned to a cell other than the end-point cell is assigned. As will be described later, according to a combination (of colors) with another cell adjacent to the end-point cell, it can be expressed whether the end-point is a "start point" or an "end point".

In the case of expressing a start point, the end-point cell may also be referred to as a start cell. In the case of expressing an end point, the end-point cell may also be referred to as an end cell.

In the case of particularly distinguishing cells other than the end-point cell from the end-point cell, they may be referred to as "configuration cells".

Linear Shape

The optical symbol of this embodiment is constructed by arranging cells linearly. The linear shape may be straight or curved. As long as a neighboring cell can be traced, any line may be employed.

Example 1-1

FIG. 1 shows an example of an optical symbol 10 expressing numerical values "12345678" (in decimal). In the example 1-1, 12345678 is represented as "101111000110000101001110" in binary. Therefore, in the example 1-1, the binary numbers "101111000110000101001110" are shown.

In FIG. 1, squares to which Y (representing yellow), M (representing magenta), and C (representing cyan) or the like are assigned are cells 1012. By connecting a plurality of cells 1012, an optical symbol 1010 is constructed.

Figure 2:
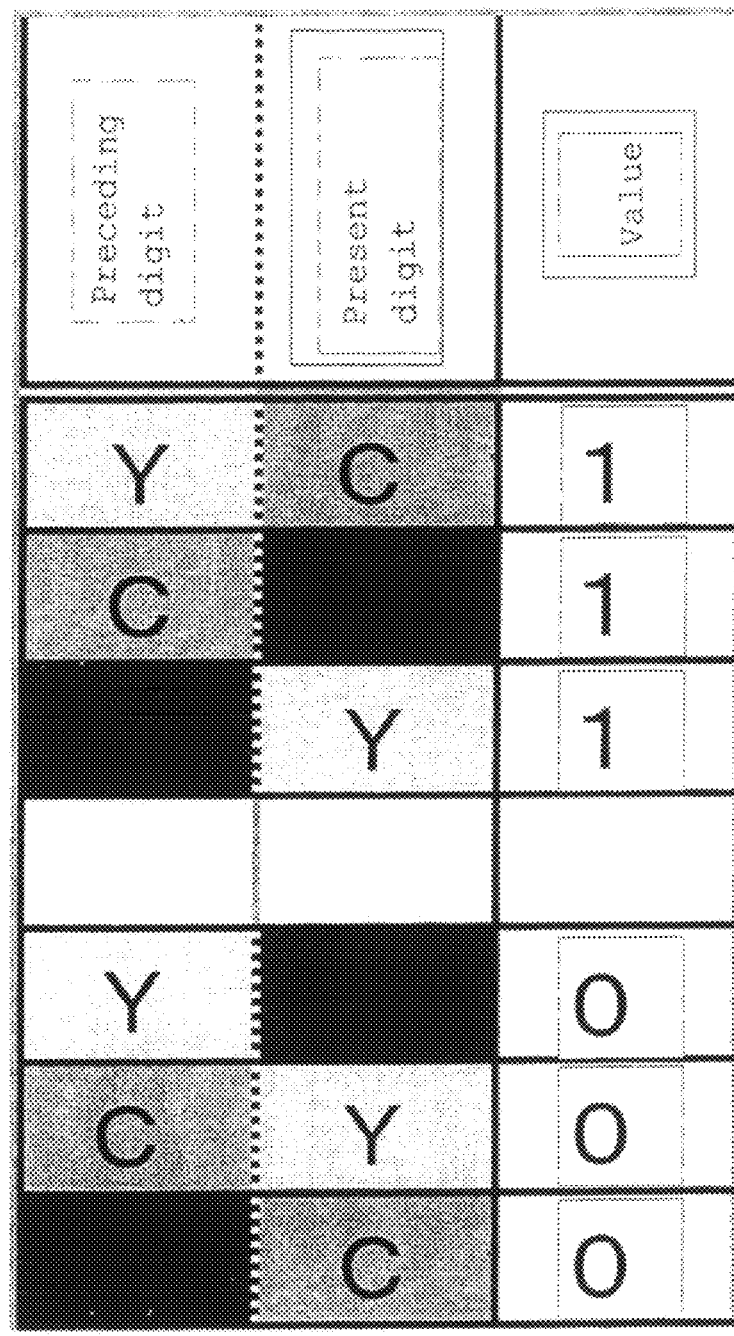
FIG. 2 is a table showing the correspondence between shift of colors and data in the first embodiment.

In the example 1-1, the elements "0" and "1" of the binary notation are expressed as in a table of FIG. 2. Specifically, "1" and "0" are not assigned to colors but are assigned to shifts of colors. In the example 1-1, black, cyan (C), magenta (M), and yellow (Y) are used, and shifts of colors from Y to C, from C to M, and from M to Y indicate "1" (see FIG. 2). Shifts of colors from Y to M, from C to Y, and from M to C indicate "0" (see FIG. 2).

That is, the value of the present digit is determined based on the color value of the cell 1012 of the present digit and that of the cell 1012 of the preceding digit. A digit refers to a part to which a numerical value is assigned. The cell 1012 in the part to which the digit is assigned may be referred to as a configuration cell 1012 so as to be distinguished from the end-point cell 1020 and the like.

In the example 1-1, 24 digits are necessary to express the binary numbers "101111000110000101001110". In the example 1-1, one digit corresponds to one cell 1012.

In the example 1-1, the first two cells 1022 and 1024 (the two cells 1022 from the left) are cells indicative of start and are cells 1022 which do not correspond to digits of the numerical values to be expressed. That is, they are not configuration cells 1012.

The first two cells 1022 and 1024 are referred to a directly neighboring cell 1022 and an indirectly neighboring cell 1024. The directly neighboring cell 1022 and the indirectly neighboring cell 1024 are different from the configuration cells 1012 expressing data.

The directly neighboring cell 0122 is a cell neighboring to the end-point cell 1020. The indirectly neighboring cell 1024 is not directly neighboring to the end-point cell 1020 but is neighboring to the directly neighboring cell 1022 or neighboring to another indirectly neighboring cell 1024. The end-point cell 1020 may be a start cell or an end cell. That is, the directly neighboring cell 1022 and the indirectly neighboring cell 1024 may exist at both of the start side and the end side.

As described above, the black cells at the left end and the right end in FIG. 1 are the end-point cells 1020a and 1020b. To the end-point cell 1020a (black) at the left end (start side), the directly neighboring cell 1022a is connected. It is defined that the color Y (yellow) is assigned to the directly neighboring cell 1022a.

The combination of "the end-point cell 1020a of black+the directly neighboring cell 1022a of Y (yellow)" indicates the start side.

To the end-point cell 1020b (black) at the right end (terminating side), the directly neighboring cell 1022b and the indirectly neighboring cell 1024b are continuously connected. It is defined that C (cyan) is assigned to the directly neighboring cell 1022b, and M (magenta) is assigned to the indirectly neighboring cell 1024b. The combination of "the end-point cell 1020b of black+the directly neighboring cell 1022b of C (cyan)+the indirectly neighboring cell 1024b of M (magenta)" indicates the terminating end side.

With the arrangement, by finding colors which are "Y connected to black" and "C and M connected to black", the end points (start and end points) of the optical symbol 1010 can be found. By using these C, M, and Y, color calibration can be performed.

As shown in the table of FIG. 2, three kinds of combinations of colors indicating numerical values "1" and "0" are prepared. In the example 1-1, description of data starts from the right side (M in FIG. 1) of Y representing start. In this case, the first digit (1 in this example) can have two options.

Figure 3:
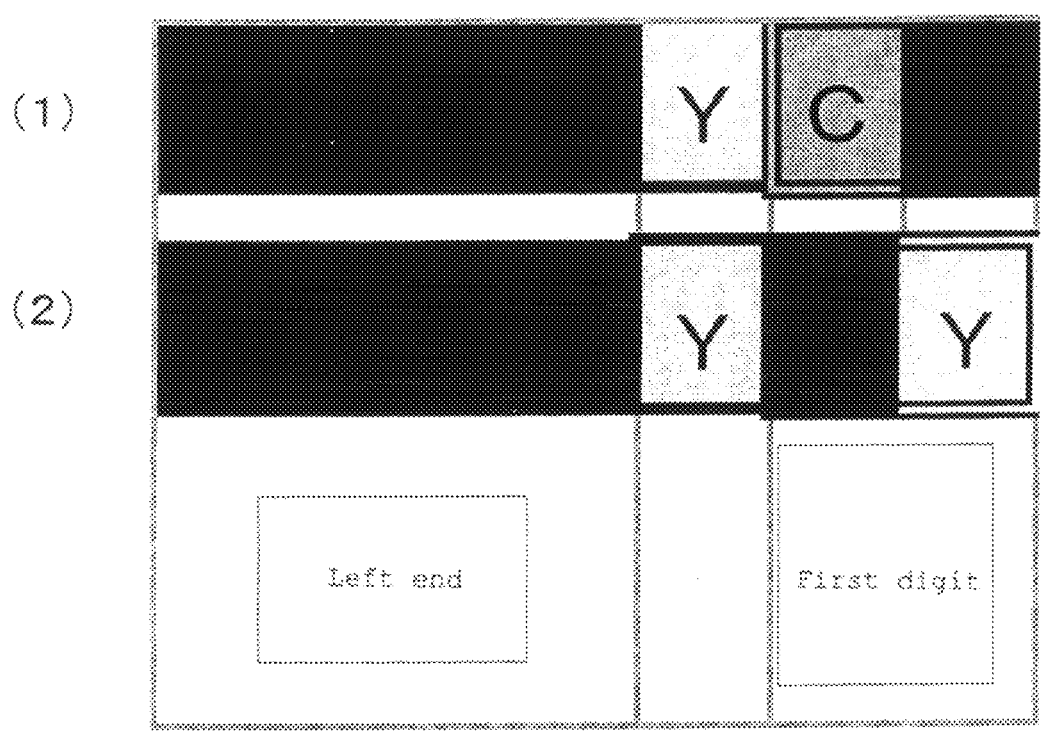
FIG. 3 is a diagram of a table showing two options in the first embodiment.

FIG. 3 shows a table indicating an example of two options. In FIG. 3(1), to the Y cell 1012 neighboring to the end-point terminal 1020 (black), the cells 1012 of C and M are connected in this order. By the combination of C and M cells, the first digit "1" is expressed. Similarly, in (FIG. 3(2), the cells 1012 of M and Y in this order are connected to the cell 1012 of Y neighboring to the end-point cell 1020 (black). By the combination of M and Y cells, "1" of the first digit is expressed.

As shown in FIG. 2, another combination expressing "1" is Y and C. However, since the combination of the end-point cell 1020 and the cell of Y is used to express the start side, the same color Y cannot be used. Therefore, to express "1", not the combination of Y and C but the combination of C and M or M and Y has to be used. There are consequently two options. Although the case of expressing "1" has been described in this example, there are also two options similarly in the case of expressing "0".

Similarly, the values in the digits are sequentially expressed by the shifts of colors.

In FIG. 2, by using the options, a parity and other distinction (plus and minus signs, or selection of binary notation (gray code or the like)) can be performed without having a special cell. Obviously, by increasing the number of cells at the left end Y and the first digit, the number of options can be increased.

Figure 4:
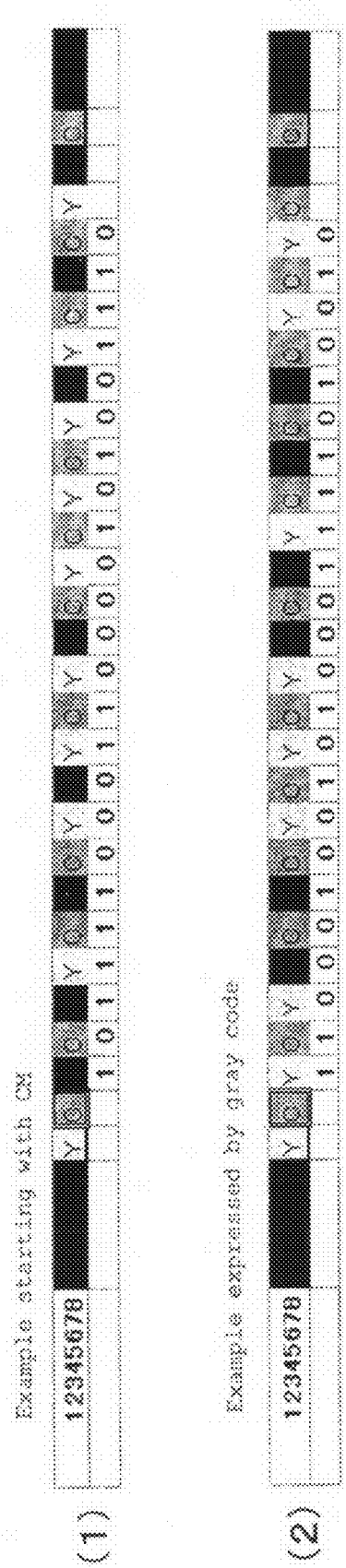
FIG. 4 is an explanatory diagram showing an example of another optical symbol in the first embodiment.

For example, FIG. 4(1) shows an example of the case where cells 1012 of C and M in this order is employed subsequent to the cell 1012 of Y. FIG. 4(2) shows an example of the case where "12345678" (in decimal) is expressed by the gray code.

Further, like the left end (start-point side (start side)), a check digit, indication of the number of digits and the like can also be placed between the final digit and a cell between M and C of the end cell at the right end (terminating side).

The end cell refers to the end-point cell 1020 representing the terminating end. In the example 1-1, the cell 1012 of C and the cell 1012 of M are provided in this order adjacent to the end cell (see FIG. 4). As described above, various functions such a check digit and indication of the number of digits can also be placed in this part.

In the above-described examples, the cell 1012 and the end-point cell 1020 are arranged in a straight line, but they may be arranged in a curved state. It is sufficient if the connection of the cells 1012 can be identified and traced.

Figure 5:
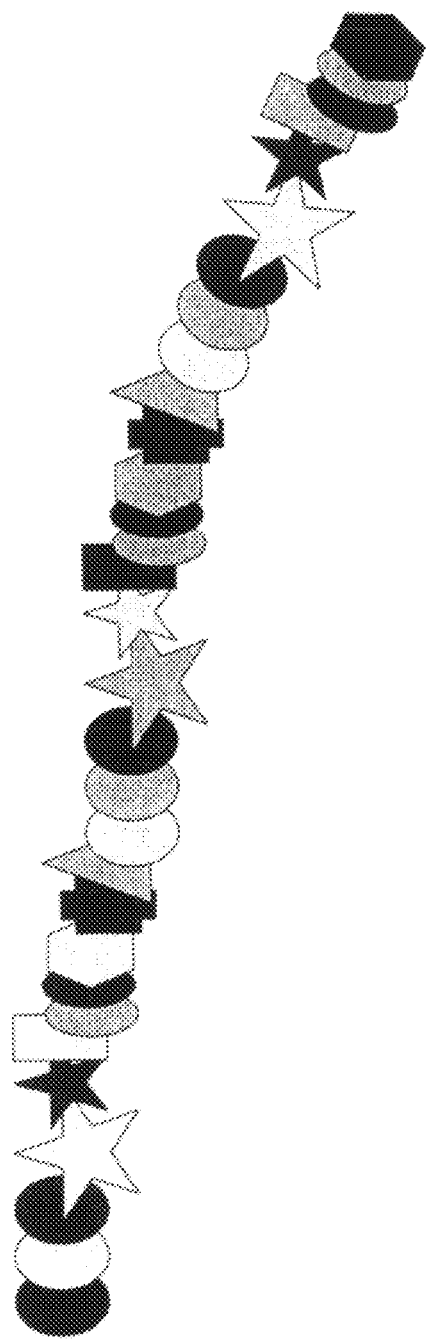
FIG. 5 is an explanatory diagram showing an example of processing the optical symbol in FIG. 1 of an embodiment 1-1 in a decorative manner.

FIG. 5 shows an example of processing the optical symbol in FIG. 1 of the example 1-1 as a design. As the shape of the cell 1012, various shapes such as circle, square, and star can be employed. As long as the connection state of the cells 1012 can be identified and the neighboring cell 1012 can be traced, the cells 1012 may be arranged linearly, circularly, or in a curved manner.

Example 1-2

Figure 6:
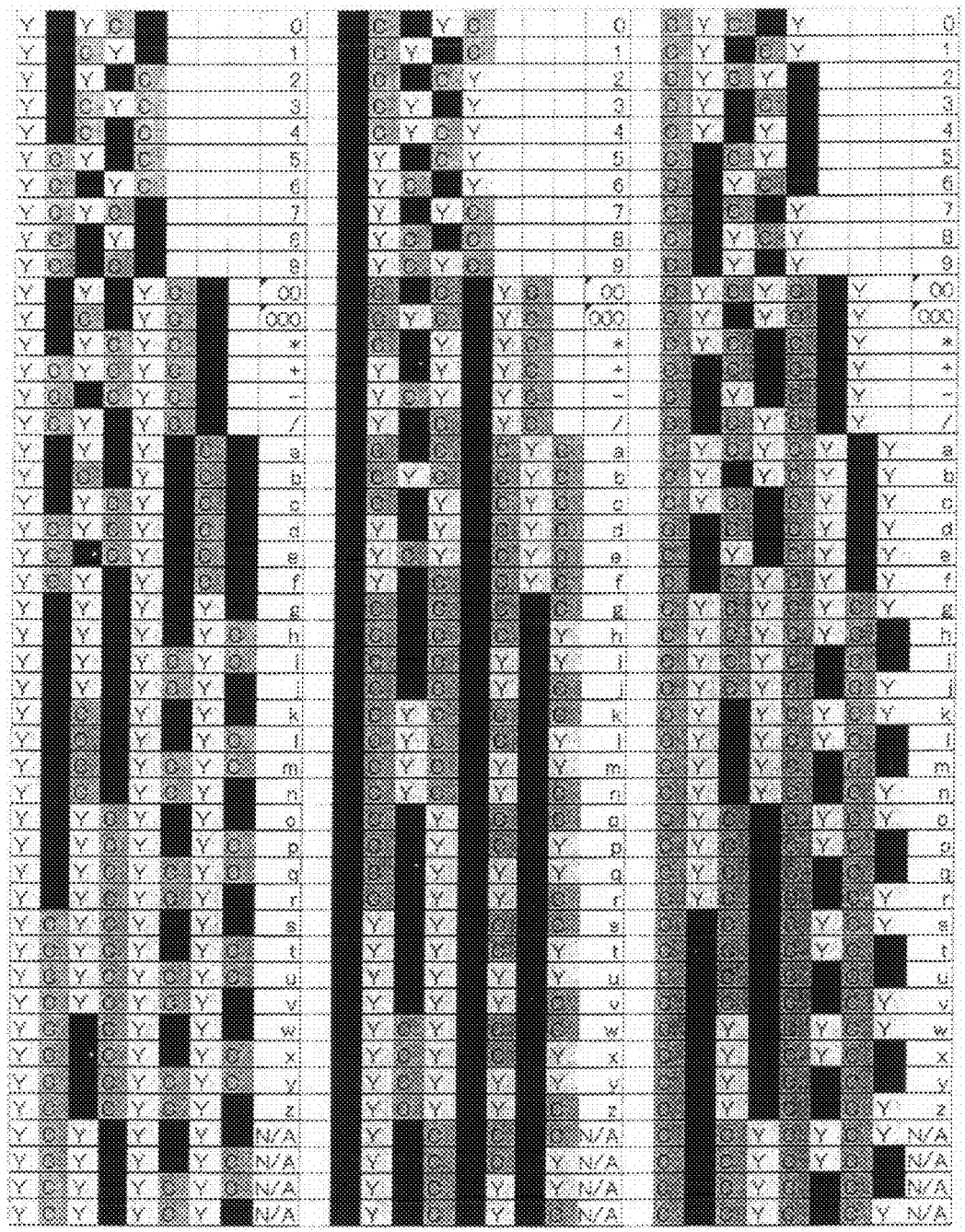
FIG. 6 shows three kinds of conversion tables for converting numerals and alphabets.

FIG. 6 shows an example of directly encoding numerals, alphabets, and the like (without converting to binary numbers). FIG. 6 shows three kinds of conversion tables showing how numerals and alphabets are converted. Three kinds of conversions, a conversion starting from C, a conversion starting from M, and a conversion starting from Y are prepared according to the color of the first cell 1012.

Specifically, there are three ways of expressing "0": arranging the cell 1012 in the order of "YMYCM", arranging the cell 1012 in the order of "MCMYC", and arranging the cell 1012 in the order of "CYCMY". One of the three ways is selected according to the color of the preceding cell 1012, one of the three ways is selected.

Figure 7:
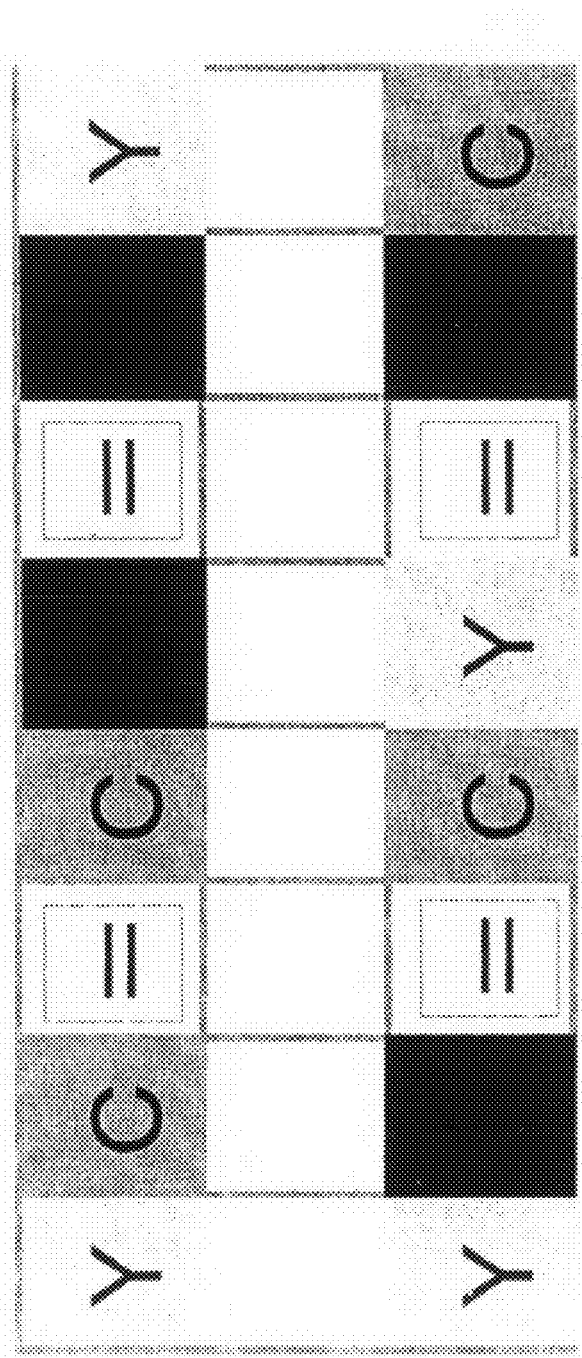
FIG. 7 is an explanatory diagram showing the relation in a color change direction.

Also in the method of the example 1-2 shown in FIG. 6, the code system is determined based on the color change direction of the neighboring cell 1012. FIG. 7 shows an explanatory diagram showing the relations of color change directions. As shown in FIG. 7, the change in colors of "YC" has the same value as those of the changes in colors of "CM" and "MY". This is also clear from the table of FIG. 6. The change in colors of "YM" has the same value as those of the changes in colors of "CY" and "MC". This is also clear from the table of FIG. 6. Similarly to the example 1-1, any color can be selected from three colors at the start.

Figure 8:
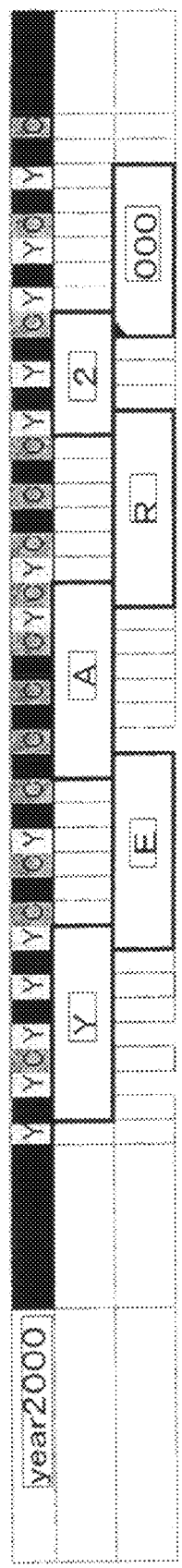
FIG. 8 is an explanatory diagram showing an example of generating an optical symbol 1010 from "year2000".

FIG. 8 shows an example of generating an optical symbol 1010 from "year2000". The end-point cell 1020 has black color similarly to the example of FIG. 1 and three colors of C (cyan), M (magenta), and Y (yellow) are used for the cells 1012. Since "y" is expressed by "MYCYMYMY" as shown in FIG. 8, to use the last character "Y", the table of FIG. 6 is searched for "e" starting from "Y". As a result, "YCM-CYMCM" is retrieved and used. Since the last character is "M", this time, "a" starting from "M" is searched. Similarly, each of the characters in "year2000" is converted to construct the final optical symbol 1010 (refer to FIG. 8).

Example 1-3

Increase in the Number of Colors

In the examples 1-1 and 1-2, to prevent errors in reading colors as much as possible, the cases of three colors (CMY) have been described. However, the three colors are not limited to CMY and naturally, RGB can also be considered. Although the color of the end-point cell 1020 is black in the above description, the end-point cell 1020 is not necessarily used. If the ground color is black, it may be used. In the case where the ground color is not black (for example, the ground color is Y), this color (Y) may be set as the color of the end-point cell 1020 and other colors may be selected for the cells 1012.

In any case, any combination of colors may be employed as long as the difference can be detected with reliability in relation with the reading conditions. If the kinds of colors used in an allowable range increase, more ideas become possible.

In the example 1-3, the case of adding one color G (green) to YMC will be described. In the example 1-3, the cell 1012 to which G (green) is assigned is used as a space cell. As a result, for example, data and the digit indication (=address) can be displayed efficiently.

Figure 9:
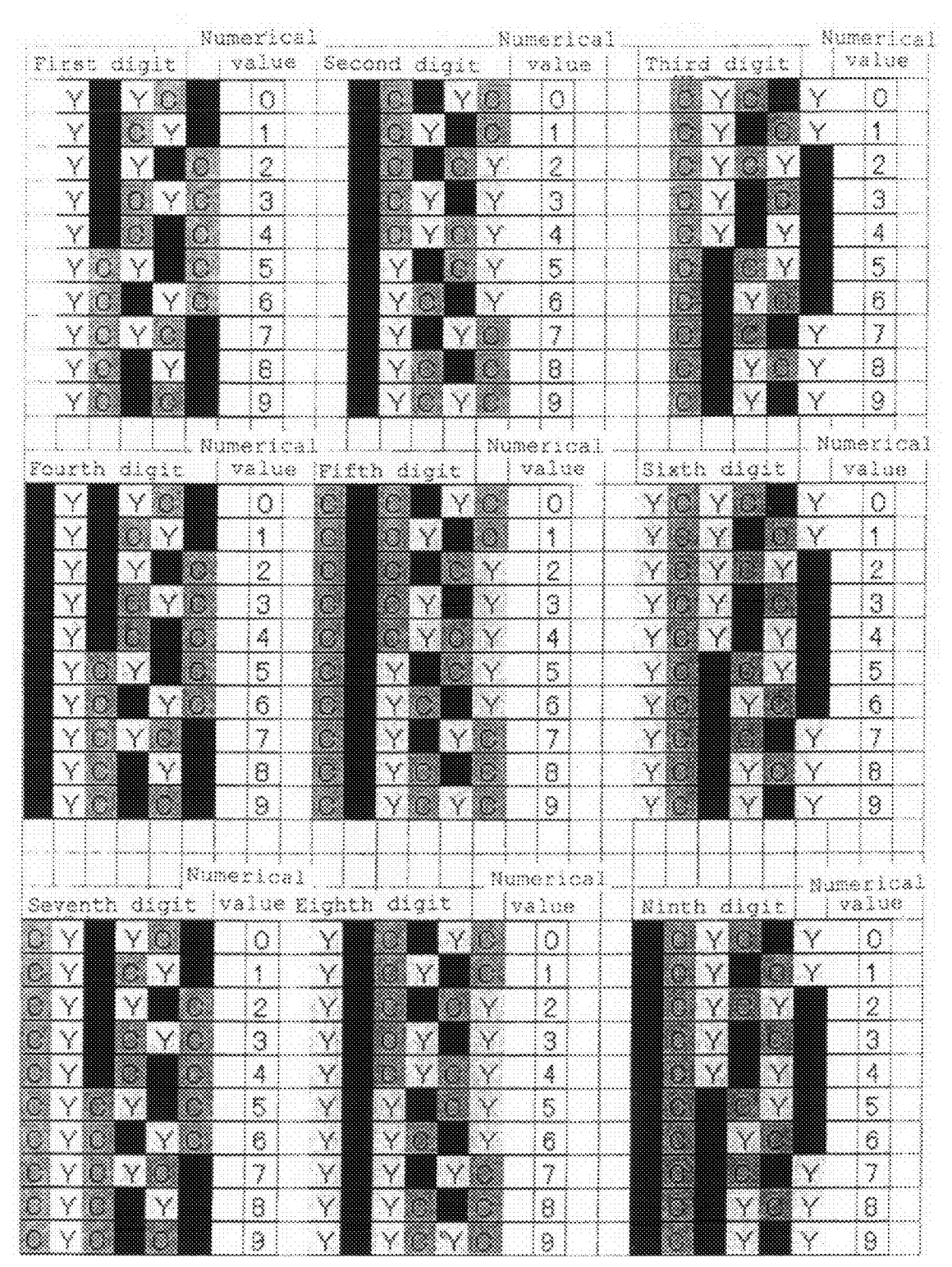
Figure 10:
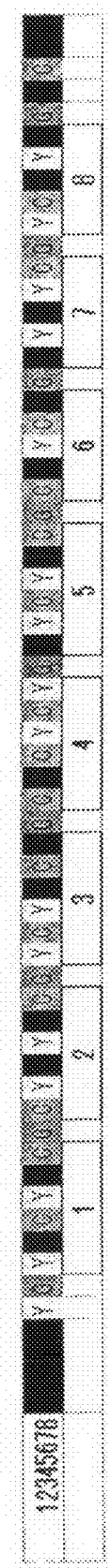
FIG. 10 is an explanatory diagram showing an example of "12345678" (in decimal).

FIG. 9 shows a conversion table in the case of the example 1-3. As shown in FIG. 9, in the example 1-3, different conversion tables are used for respective digits. FIG. 10 shows an example of expressing "12345678" (in decimal) by using these conversion tables. As shown in FIG. 10, in the example 1-3, the cells 1010 to which G (green) is assigned are used as space cells 1030 (cells as separations between digits). By the existence of the space cell 1030, the digits can be easily distinguished from each other.

For example, the left end shows the eighth digit, and thus the table of the eighth digit in FIG. 9 is used. Since "YMCYMC" in this table expresses "1", this is used for the part of the first digit. Next, the cell 1010 to which G (green) is assigned follows as the space cell 1030, and the seventh digit is placed. As the seventh digit, the table of the seventh digit in FIG. 9 is used. When the table is searched for "2", "CYMYMC" is retrieved, and thus this is used as the seventh digit. Similarly, the operation is continued to the last first digit. Finally, the space cell 1030, an M cell 12+C cell 1012 representing the terminating end, and the end-point cell 1020 are placed, thereby completing the final optical symbol 1010 (see FIG. 10).

In the example 1-3, since the number of digits (=address) and the numerical value are both shown, the (digit) position in the optical symbol 1010 can be changed. The optical symbol 1010 can also be divided into a plurality of optical symbols 1010. That is, as understood from FIG. 9, in the example 1-3, the conversion tables for the respective digits are used, and the conversion results are different among the respective tables. Therefore, based on the pattern of the conversion results, the digit of the data can be easily known. In any case, in the present invention, if the number of colors used is increased, accumulation of data can be reliably improved.

Example 1-4

Decoding of Optical Symbol

An operation of reading the optical symbol 1010 and restoring the original data is called decoding. Although there are various procedures for decoding, a typical preferable example is as follows:

(1) An image of a predetermined item including the optical symbol 1010 is captured by a CCD camera or the like and taken as image data.

The CCD camera is a typical example of a sensor so-called an area sensor. Image data may be captured by other area sensors.

(2) From the image data,
 (a) end-point cells 1020a and 1020b,
 (b) Y cell (directly neighboring cell 1022a) neighboring to the end-point cell 1020a, and
 (c) C cell (directly neighboring cell 1022b)+M cell (indirectly neighboring cell 1024b) neighboring to the end point cell 1020b are retrieved.

Each of the directly neighboring cell 1022 and the indirectly neighboring cell 1024 has a characteristic that it does not have continuous configuration cells 1012 on both sides. Each of the directly neighboring cell 1022 and the indirectly neighboring cell 1024 has a characteristic that, in the case where it is connected to the configuration cell 1012, the configuration cell 1012 is connected only on one side. Based on such conditions, the directly neighboring cell 1022 and the indirectly neighboring cell 1024 are retrieved.

(3) A continuous series of a group of configuration cells 12 connecting between the Y cell (directly neighboring cell 1022) neighboring to the end-point cell 1020a (start cell) and the C cell (directly neighboring cell 1022*b*)+M cell (the indirectly neighboring cell 1024*b*) is traced and identified.

(4) A white area in the image is regarded as excessive light due to total reflection, and it is determined that the area is not a part of the optical symbol 1010.

(5) The image is averaged for every predetermined area to eliminate the influence of components of noise, fine shadow, dirt, and the like. In other words, noise elimination by filtering is performed. A median filter and other various conventionally known filtering means can be used.

(6) It is determined that a part other than the linear continuous part connected to the configuration cell 1012 (part other than the configuration cells) is not a part of the optical symbol 1010 according to circumstances such as shadow and the ground color.

(7) In the determination, it is also preferable to use the difference of images when the irradiation is changed or the like.

(8) Peaks of the continuous components of Y, C, and M of the configuration cell 1012*s* are captured. Based on decoding specifications, coding and a check are performed. Herein, decoding will be called coding.

By such a method, decoding of the optical symbol 1010 is executed.

Summary 1

As descried above, the code system proposed in this embodiment has the following characteristics:

With respect to the optical symbol used in the first embodiment, the neighboring cell can be traced reliably from both ends in a chain-reaction manner by means of the end-point cell 1020, the directly neighboring cell 1022, and the indirectly neighboring cell 1024.

Colors used can be only colors pure to a reading device of the three-primary-color system. The system has high tolerance for variations in color degradation, illumination, printing, and the like.

Since data notation depends only on the order of expression colors, even when the size of the range (cell) of each color varies, the influence exerted on reading characteristic is small.

Since the concept of tracing neighboring cells in order and capturing the color of each of the neighboring cells is employed, the influence exerted on the reading characteristic is small even if a cell is narrow, bent, or folded.

Further, the shape of each cell has flexibility. Even when a cell has a square, triangle, circle, start, or letter shape, the influence exerted on the reading characteristic is small.

A sign (data) expressed by a cell is determined by a relation between the color of the cell and that of a cell neighboring to the cell.

According to how the sign (data) of a cell is expressed, a check, a notation, and the like can be distinguished.

Preferably, depending on the kind of a light source, a color corresponding to the excessive light amount is not used.

Modifications (1) It is preferable to provide a reference cell as a reference of reading in a predetermined place to perform calibration. The reference cell is realized by placing cells colored with C, M, and Y in predetermined places.

The calibration is performed on the colors of the configuration cells 1012 and the color differences between the configuration cells.

To clarify the difference between the configuration cell 1012 and the other part, confirmation (calibration) of the color difference between the end-point cell 1020 and the configuration cell is performed.

To enable the chain of the configuration cells 1012 to be traced, it is preferable to occupy the both sides of the chain by colors which are similar to those of the end-point cells 1020 (and can be reliably distinguished from the colors of the configuration cells 1012).

In the above examples, colors of the configuration cells are selected from the group of three colors C, M, and Y. For the end-point cells 1020, "black" different from the three colors is used. Therefore, it is preferable to use black also for the "both sides".

Figure 11:
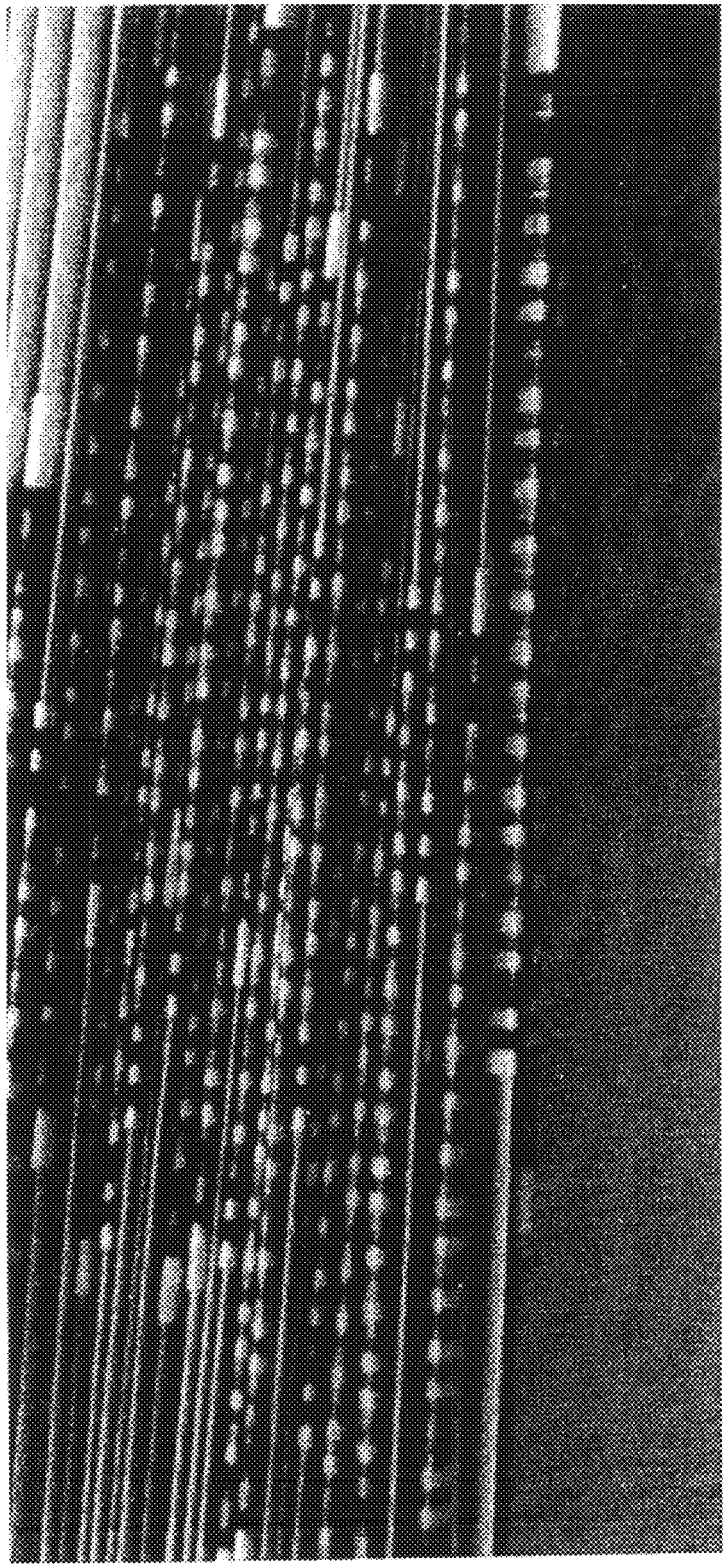
FIG. 11 is an explanatory diagram showing an example of an optical symbol attached to the edge of an envelope.

(2) One of preferable applications of the optical symbol 1010 continuous one-dimensionally like in the first embodiment is to attach the optical symbol 1010 to, for example, an edge of an envelope as one of suitable use methods. FIG. 11 shows an example of such an application. FIG. 11 shows an example of the optical symbol 1010 in which colors are arranged in line at the edge of an envelope. In such an example, both ends of the configuration cells 1012 are generally shadows. Therefore, in practice, it is appropriate to use a blackish achromatic color similar to the shadow for the end-point cells 1020 in the optical symbol 1010.

The "both sides" refer to two directions perpendicular to the extension direction of the optical symbol 1010.

(3) To distinguish from the outside of the end-point cell 1020 (the color of the envelope in FIG. 11), very preferably, the colors of the end-point cells 1020 and the directly neighboring cells 1012 appear repetitively a few times. FIG. 12 shows such an example.

Figure 12:
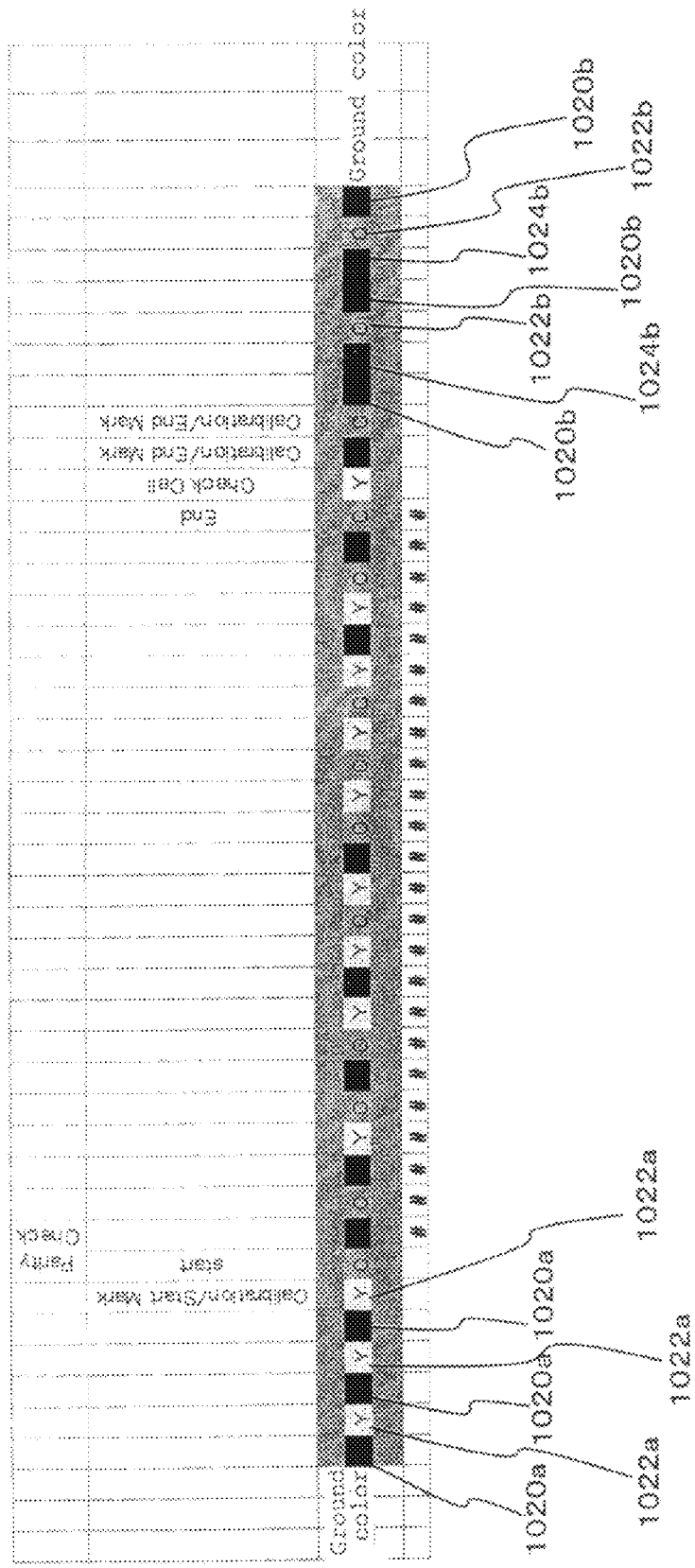
FIG. 12 is an explanatory diagram showing an example in which colors of an end cell and a directly neighboring cell appear repetitively several times.

In the example shown in FIG. 12, at the left end (start side), (1) black (end-point cell 1020*a*) sandwiched by Y is found and, at the same time, the directly neighboring cells 1022*a* to which Y is assigned are found. (2) Out of the directly neighboring cells 1022*a* found, the directly neighboring cell 1022*a* which does not have black on both sides, that is, the directly neighboring cell 1022*a* which does not have black (end-point cell 20) on at least one of the sides is found. The found directly neighboring cell 1022*a* is determined to be the directly neighboring cell 1022*a* on the start side and the calibration cell 10102*a* determining Y for calibration.

In the example of FIG. 12, since the arrangement of "black, Y, and C" exists on the start side, the Y configuration cell in the center of the arrangement is the "Y configuration cell 12 on the start side and the configuration cell 1012 determining Y for calibration".

By such recognition, erroneous recognition that the configuration cells 12 are continued to the base color side can be prevented even when the base color is close to yellow, for example.

In the example of FIG. 12, the set of "end-point cell 1020*a*+ directly neighboring cell 1022*a*" is repeated three times on the start side. On the terminating end side, the set of "end-point cell 1020*b*+directly neighboring cell 1022*b*+indirectly neighboring cell 1024*b*" is repeated three times on the terminating end side.

(4) In the case of attaching an optical symbol of this embodiment to a transparent plastic case, in many cases, the above-described "both ends" of the configuration cells 1012 are gray (achromatic color) close to white Therefore, in such a case, it is preferable to trace the chromatic color of the configuration cell 1012 as a mark, to read and decode the optical symbol.

Second Embodiment

Figure 13:
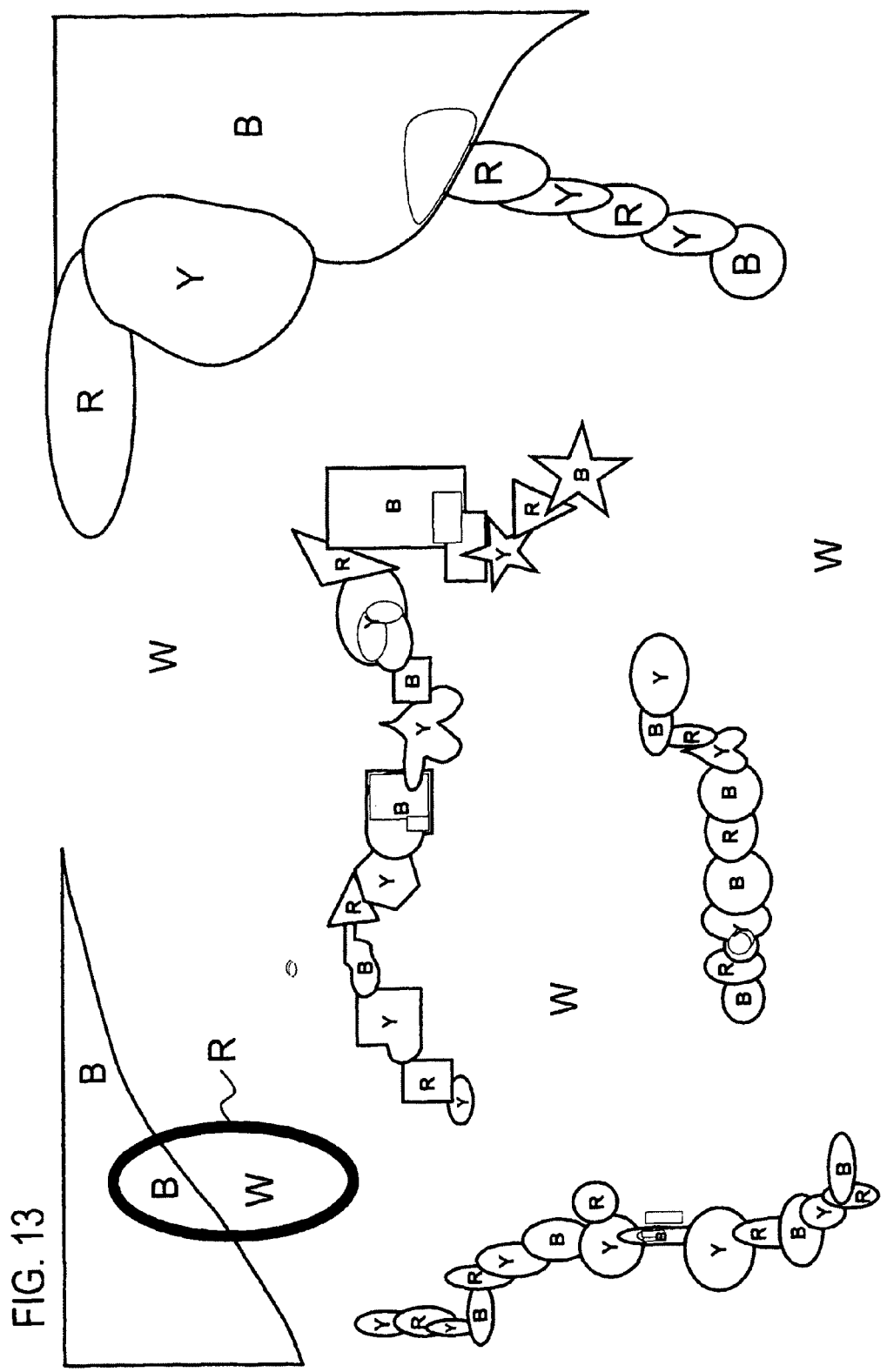
FIG. 13 is an explanatory diagram showing an example of a result of a color averaging process on image data in a second embodiment.
Figure 14:
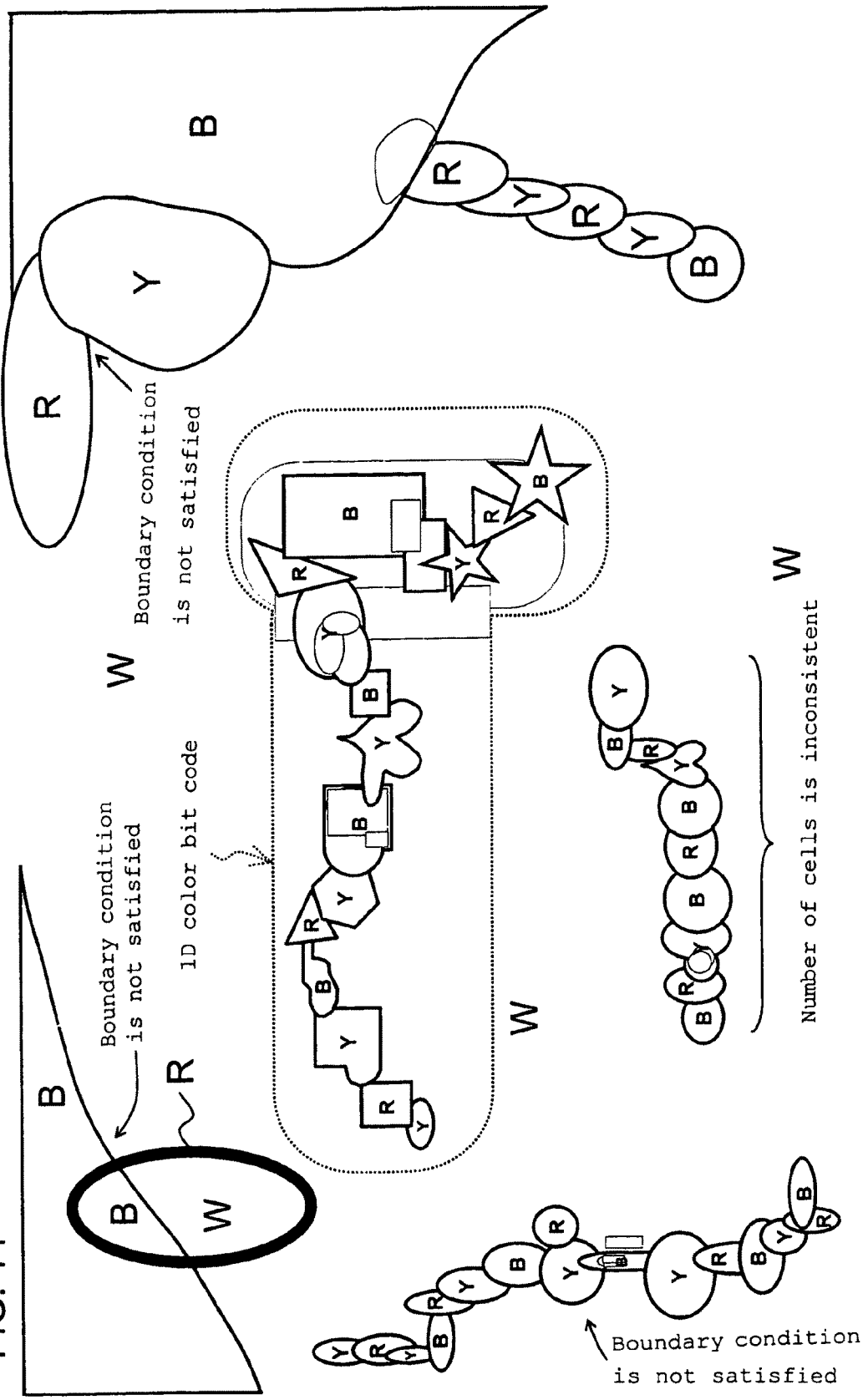
FIG. 14 is an explanatory diagram showing a state of a 1D color bit code which is cut out in the second embodiment.

With reference to FIGS. 13 and 14, a second preferred embodiment of the 1D color bit code cutout method according to the present invention will be described in detail.

1. Definition of 1D Color Bit Code

Definition of the 1D color bit code devised by the inventors of the present invention will now be described. The 1D color bit code is defined as follows:

The 1D color bit code is "cells" as predetermined color areas which are arranged in a line (="cell sequence");

A plurality of colors is used, and a color is assigned to each cell;

The cells do not include each other. That is, a cell is not included in another cell;

The number of cells constituting a sequence is a predetermined number; and

The same color is not assigned to neighboring cells, but different colors are always assigned.

A 1D color bit code is generated basically based on these conditions.

2. Actual Cutout and Decoding 2.1 Division into Color Areas

Prior to cutout, image data is divided into color areas as follows:

Image data including a 1D color bit code is captured by an area sensor; and

The image data is divided into a plurality of color areas based on the definition.

In the second embodiment, an example of dividing the image data into blue, red, yellow, and white will be described.

This embodiment is described on an assumption that the 1D color bit code is a sequence of "cells" of blue, red, and yellow, and the number of "cells" is 15. That is, any of blue, red, and yellow is assigned to each of the cells of the 1D color bit code.

Originally, "original image" data captured by the area sensor is constructed by various colors including background, and patterns of the "original image" data are also various. "Color averaging process" of classifying the colors in the original image data into blue, red, yellow, and achromatic color in a color space, and applying the colors of pixels to the areas is performed. In short, the pixels are subject to so-called labeling process.

The blue, red, and yellow are originally defined as colors (blue, red, and yellow) constructing a marking pattern of the 1D color bit code. However, "blue, red, and yellow" used for division correspond to a predetermined range of colors which is set in a color space in consideration of variations in illumination, coloration, degradation of colors, and the like. This is called a "marking color range".

In other words, a predetermined specific "red" is used in marking, while colors in a predetermined color range including "red" as a center are recognized as "red" (marking color range) in reading. This is the above-described color averaging process.

The achromatic color is defined as a color out of the "marking color range". The color of a quiet zone is also handled as a color out of the "marking color range". The quiet zone represents a part other than the ID color bit code and plays the role of partition between codes. Consequently, the quiet zone is naturally handled as described above.

In this embodiment, colors out of the marking color range are recognized as colors in the quiet zone (which are called space colors) as a part of the "color averaging process" described above. The space colors as colors in the quiet zone are, for example, white in this embodiment. That is, all of colors out of the marking color range are regarded as white and converted to white.

Although all of pixels determined to be out of the "marking color range" are converted to white, any colors except for the blue, red, and yellow (marking color range) may be used. This operation is also a part of the color averaging process.

At the time of performing the "color averaging process" on data of the "original image" as described above, entry of noise components cannot be usually avoided. An abnormal change in color in a very small region corresponding to the noise can be eliminated by adjusting the color of the region to the color in the periphery or performing noise removing process such as averaging.

FIG. 13 shows an example of the result of such color averaging process.

In FIG. 13, a "background pattern" is purposely set similar to the ID color bit code. The number of color bit codes to be detected in FIG. 13 is only one.

The correct 1D color bit code to be detected is a series of color areas in the center portion. Although some other series of color areas exist in FIG. 13, they are excluded from candidates of color bit codes by the following three determination steps. Finally, a remaining candidate is a color bit code to be detected.

2.2. Cutout and Decoding

The cutout process will be described below.

(1) Determining Step 1 (Boundary Conditions)

First, the boundary conditions for an area of each color are determined.

Specifically, in the color areas other than white, a requirement that the area is a "cell" as a component of the "cell sequence" is that either of the following boundary conditions is satisfied.

Condition "a": The periphery of the area is completed as "white-another color-white-another color". In this case, the area corresponds to an "intermediate cell".

Condition "b": The periphery of the area is completed as "white-another color". In this case, the area corresponds to a "terminating end cell".

In the example, another color refers to a color which is not white but is any of three colors of blue, red, and yellow except for the color of the cell (area) (if the cell is red, the another color is blue or yellow).

The "intermediate cell" is a "cell" other than the both ends of the cell sequence. Since the intermediate cell is a component of the cell sequence, two neighboring cells exist and the colors of the two cells (areas) are different from the color of the intermediate cell according to the definition of the 1D color bit code. Further, according to the definition of the 1D color bit code, the areas other than the two areas are surrounded by the quiet zone. The quiet zone is an area of "achromatic color" as described above, but is converted to white.

As a result, when an area is an intermediate cell in the cell sequence, the condition "a" is to be satisfied. When the condition "a" is satisfied, there is the possibility that the area is an intermediate cell.

The "terminating cell" is a "cell" at both ends of the cell sequence. Since the terminating cell is an end point of the cell sequence, only one neighboring cell exists, and the color of the one cell (area) is different from the color of the terminating cell according to the definition of the 1D color bit code. Further, according to the definition of the 1D color bit code, the periphery other than the neighboring one area is the quiet zone. The quiet zone is an area of "achromatic color" as described above, but is converted to white.

As a result, if an area is the terminating cell of the cell sequence, the condition "b" is to be satisfied. If the condition "b" is satisfied, the possibility that the area is the terminating cell is high.

The possibility that a color area which satisfies neither of the conditions "a" and "b" (for example, an area with which three colors are in contact without the ground color therebetween, an area surrounded by only one color, and the like) is a component of the cell sequence is zero. Consequently, the color area is determined to be a "background image", and all of color areas except for white in contact with the background image area are determined to be "background image" areas. White corresponds to the quiet zone as described above.

(2) Determining Step 2 (Number of Cells)

The color areas which remain as candidates (cell sequence candidate areas) without being excluded in the determining step 1 are supposed to be lined. However, the number of color areas lined may be different from that of a desired 1D color bit code. Therefore, the color areas are further narrowed down under the condition of the number of cells (the number of cells in the 1D color bit code is known, and the cells whose number matches the known number are determined to be "cells" constructing the areas of the 1D color bit code).

(3) Determining Step 3 (Termination Condition)

Next, the code areas are further narrowed down according to the termination conditions of the 1D color bit code (the start cell (group) is yellow and red, and the end cell is blue). The terminating cells have two kinds of cells; the start cell (group) and the end cell (group). Each of the start and end cells is made of one or more cells (group). In the second embodiment, as described above, the start cell group is made of two cells, and the end cell is made of one cell. The setting of each of the colors is referred to as a termination condition.

The code areas may be narrowed down according to the intermediate point conditions instead of the termination conditions. Setting of colors such that an intermediate cell in an intermediate position other than the both ends of the cell sequence is yellow or red, or blue is referred to as an intermediate point condition.

It is also preferable to use the intermediate point condition in place of the termination point condition. Further, it is also preferable to examine the intermediate point condition in addition to the termination point condition and leave only cells satisfying both of the conditions to narrow down the code areas.

(4) Determining Step 4 (Decoding)

An attempt is made to decode the color areas passing all of the determining steps 1 to 3, that is, remaining final candidate areas of the 1D color bit code according to the order of the colors. The consistency of a check digit or the like is checked.

As a result, an area finally normally decoded (without an error) and its value are "cut out" and the "decoding" is completed.

2.3 Auxiliary Process (1) Area Enlargement

A case where color areas of marking are not always in contact is also assumed depending on the marking specifications. There is also a case where the color areas are arranged like a so-called stepping stones. Even in the case where the island-state color areas are arranged apart from each other in predetermined distances, the 1D color bit code can be satisfied as long as the arrangement can be recognized (traced).

In this case, it is preferable to enlarge the color areas to a predetermined size, and apply the algorithm assuming that the color areas are in contact with each other. Enlargement (expansion) of the predetermined area is known as a basic imaging process (for example, line thickening process of thickening a thin line) which can easily be easily carried out by a person skilled in the art.

(2) Area Reduction

There may also be a case where, depending on the marking specifications, color areas of marking are enlarged and overlap portions become excessive. In this case, the overlaps of the color areas increase, and even a situation that the order of arrangement of color areas cannot be recognized is assumed.

In this case, it is preferable to reduce the color areas by a predetermined amount. Preferably, the color areas are reduced by a predetermined amount so that the arrangement of the color areas can be recognized and, after that, the algorithm is applied. Reduction (decrease) of the predetermined area is known as a basic imaging process (for example, line narrowing process of narrowing a line) which can easily be carried out by a person skilled in the art.

2.4 State of Cutout Color Bit Code

FIG. 14 shows a state of the 1D color bit code which is cut out as described above. As shown in FIG. 14, although there are five sets (candidates) of color areas which are likely to be the 1D color bit code, only one line in the center is cut out as a 1D color bit code and is decoded.

The upper left set is excluded in the determining step 1 for the reason that the boundary condition is not satisfied. The lower left set is also excluded in the determining step 1 for the same reason that the boundary condition is not satisfied. The set in the lower center is excluded in the determining step 2 for the reason that the number of cells (10) does not match the desired number of 1D color bit codes (in this case, 15). The set at the right end is excluded in the determining step 1 for the reason that the boundary condition is not satisfied.

As a result, only the set in the center satisfies the boundary condition and the condition of the number of cells (15), and thus it is finally cut out as the 1D color bit code and is decoded.

In FIGS. 13 and 14, R represents red, Y represents yellow, and B represents blue. W represents white.

3. Division into Color Areas

In the above-described "2.1 Division into Color Areas", for example, the color averaging process of regarding, as red, a whole predetermined range of red as a center. The process is similarly performed with respect to yellow and blue. It is sufficient to employ various approximated areas as the predetermined range. It is also preferable to set a range in a predetermined Humming distance from pure red.

In many cases, since image data itself is obtained as data made of the three primary colors of R (red), G (green), and B (blue), it is preferable to perform the color averaging process on the RGB data.

It is also preferable to convert the RGB data to the HSV format and then perform the color averaging process. Needless to say, the HSV is data made of hue, saturation (also called purity), and value and has hue components. There is consequently the possibility that calculation on a predetermined range using a red-based predetermined range, a yellow-based predetermined range, and a blue-based predetermined range becomes easy. Obviously, data other than the predetermined ranges is converted to "white" as described above. Mutual conversion between the RGB data and the HSV data is performed conventionally and is easy for the person skilled in the art.

The colors expressed by RGB and H (hue) of HSV correspond to a preferred example of the parameters showing the colors described in the claims.

Such HSV format corresponds to a preferred example of data expressing colors including hue. Another data format may be employed as long as hue is expressed.

4. Computer and Software (1) The method of recognizing the optical recognition code has been described above. In the foregoing embodiments, basically, digital image data is employed as image data. Consequently, it is preferable to execute the methods by hardware or software capable of processing such image data.

Typically, it is preferable to construct the "optical recognition code recognizing apparatus" for executing the operations by using a computer and programs executed by the computer and execute the "optical recognition code recognizing method".

Preferably, such a program is stored in a predetermined recording medium. For example, it is preferable to store the programs in various semiconductor storages such as a hard disk, various optical discs, and a flash memory.

It is also preferable to construct the programs and the computer in separate devices. For example, it is also preferable that a program is stored in a server, and a remote client computer executes the program in the server via a network.

(2) Preferably, image data is typically captured by a CCD camera or the like. Data captured by an analog camera may be converted to a digital signal.

5. Modifications (1) In the above example, the case where only one 1D color bit code exists has been described. However, obviously, a plurality of 1D color bit codes may exist. A plurality of final candidates are left and decoded to obtain original data.

(2) In the above example, the areas are classified by performing the color averaging process on red, yellow, and blue. However, any colors may be used and the number of colors may be four or more. It is also suitable to use green, cyan, magenta, and the like.

(3) In the above example, all the pixels determined to lie out of the "marking color range" are converted to white (space color). However, the space color may be any colors except for blue, red, and yellow (marking color ranges).

Third Embodiment

With reference to FIGS. 15-26, a third preferred embodiment of the 1D color bit code cutout method of the present invention will be described in detail.

Embodiment 3-1

Expression Using a Plurality of Code Symbols

Figure 15:
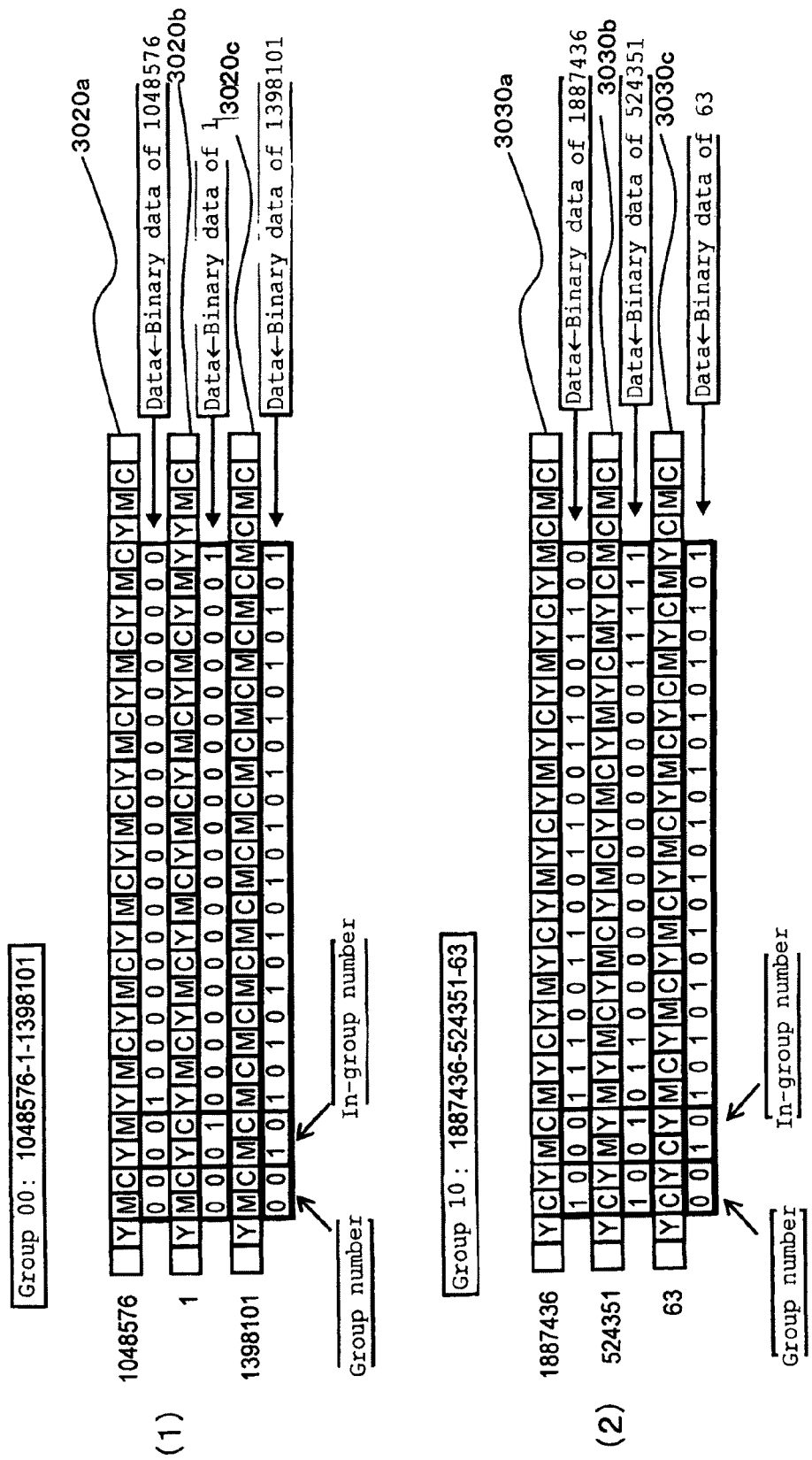
FIG. 15 is an explanatory diagram showing a state where data is expressed by a plurality of code symbols in a third embodiment.

FIG. 15 shows an example in which data is divided into three parts which are expressed by three code symbols 3020*a*, 3020*b*, and 3020*c*. The data is expressed by a group of the three code symbols (3020*a*, 3020*b*, and 3020*c*).

In the example shown in FIG. 15, the group expresses data including, in addition to the "data" to be expressed, group identification data indicating the group and in-group order identification data indicating the order of each code symbol in the group.

The three code symbols 3020 include common group identification data. Further, the three code symbols include the in-group order identification data indicating the order of the code in the group, which is different for each code.

Group Identification Data

In the example of FIG. 15(1), group identification data is "00". The first two digits of data in a code symbol indicate the group identification data. As shown in FIG. 15, all of the group identification data in the three code symbols are "00". In the embodiment 3-1, since numbers are used as the group identification data, the group identification data is also referred to as a group number.

An example of using data other than a simple numerical value as the group identification data is described in the following embodiment 3-2.

In-Group Order Identification Data

In the example shown in FIG. 15(1), the in-group order identification data are "00", "01", and "10", and the patterns of colors expressing the numbers are included in the code symbols.

In the embodiment 3-1, since numbers are used as the in-group order identification data, the group identification data is also referred to as in-group number.

Data Expression

In the example shown in FIG. 15(1), the code symbols express the group identification data, the in-group number order identification data, and the data to be expressed in this order. The data to be expressed in the case of the upper code symbol is 1048576 (in decimal), which is shown in binary expression in FIG. 15(1). Similarly, data to be expressed by the middle code symbol is 1 (in decimal), which is shown in binary expression in FIG. 15(1). The data to be expressed by the lower code symbol is 1398101 (in decimal), which is shown in binary expression in FIG. 15(1).

In the example shown in FIG. 15(1), data "1048576-1-1398101" is expressed.

Reading

In the case of FIG. 15(1), in reading the 1D color bit code, it is easy to read the three code symbols simultaneously. This is because the 1D color bit code occupies a predetermined area, which has to be captured and read by a CCD camera or the like, and since a predetermined area is captured, in principle, it is easy to obtain a plurality of 1D color bit codes. In a conventional so-called barcode, it is assumed that a barcode has a linear shape, in many cases, only a predetermined line is scanned. Consequently, in principle, it is difficult to read a plurality of conventional barcodes.

Therefore, by adding the group identification data indicative of the group and the in-group order identification data in addition to original data to be expressed (data obtained by dividing the original data into three pieces), the original data to be expressed can easily be restored.

As described above, in the third embodiment, unlike the conventional stitching, an effect equal to or larger than that of the conventional stitching can be obtained at a time by a method of dividing a code symbol expressing a single piece of data into a plurality of pieces and marking the divided data.

Another Example

FIG. 15(2) shows another example. In this example, data is divided into code symbols 3030*a*, 3030*b*, and 3030*c* which are recorded. The example of FIG. 15(2) is the same as that of FIG. 15(1) except for the point that the group identification data is "10", and the point that data to be expressed is data "1887436-524351-63".

Embodiment 3-2

Expression Using a Plurality of Code Symbols (No. 2)

It is also preferable that the group identification data and the in-group order identification data are given as color patterns instead of numerical data. Such examples are shown in FIGS. 16 and 17.

Figure 16:
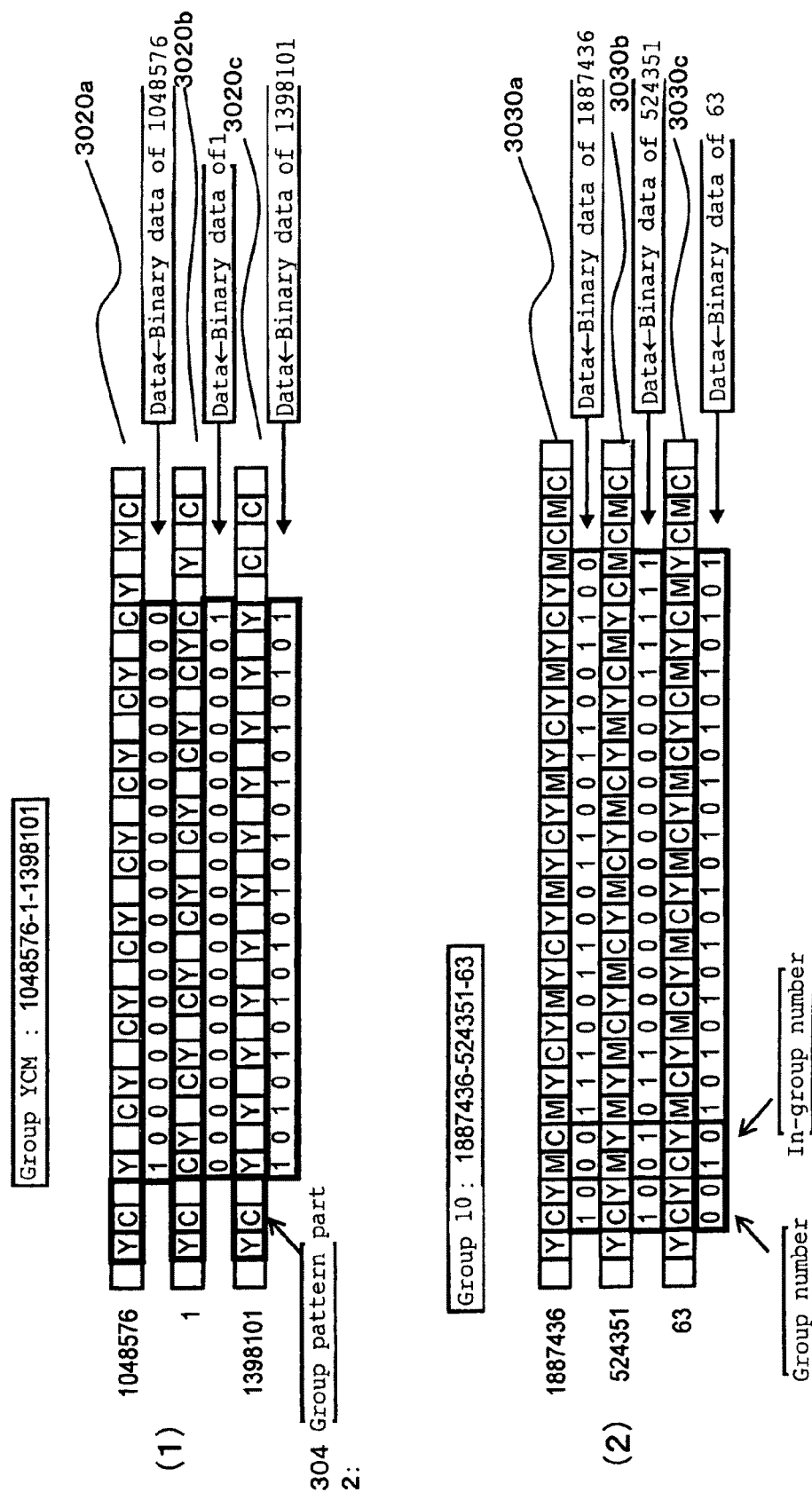
FIG. 16 is an explanatory diagram showing a state of a 1D color bit code in the case where group identification data and in-group order identification data are given as patterns of colors.
Figure 17:
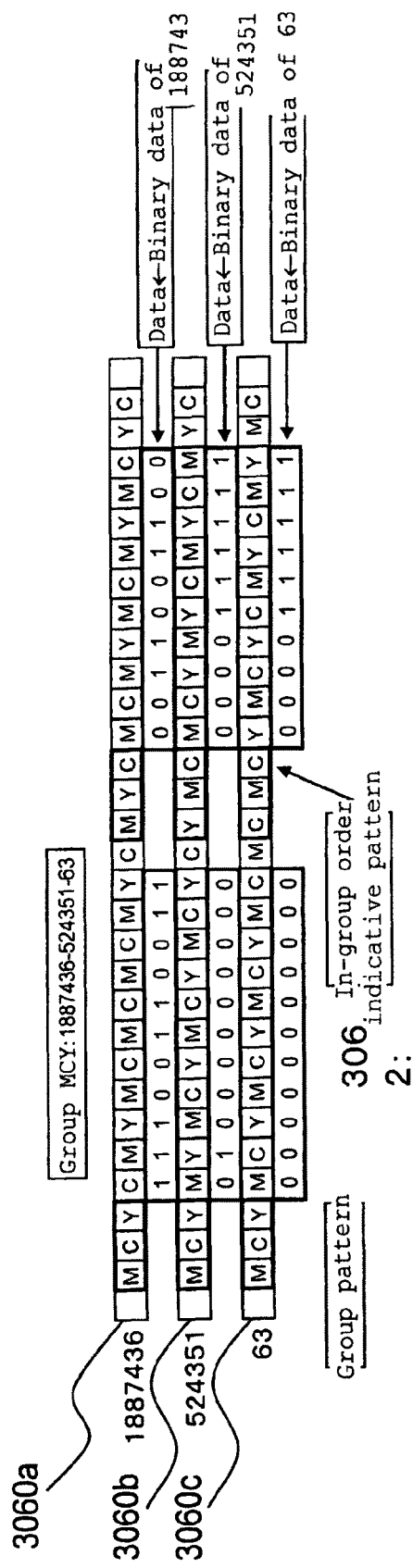
FIG. 17 is an explanatory diagram showing a state of a 1D color bit code in the case where group identification data and in-group order identification data are given as patterns of colors and, particularly, the in-group order identification data is placed in an intermediate position in the code.

FIG. 16 shows an example in which data is divided in three parts which are expressed as three code symbols 3040a, 3040b, and 3040c, similarly to FIG. 15. The data is expressed by a group of three code symbols (3040a, 3040b, and 3040c).

In the example shown in FIG. 16, the group identification data and the in-group order identification data are expressed in color sequence patterns.

Group Identification Data

In the example shown in FIG. 16, the group identification data is "YCM". In the example, the colors themselves are used as group identification data which is indicated by a group pattern part 3042 in the code symbol. In the example of FIG. 16(1), the group identification data is "YCM", and "YCM" is assigned to the corresponding colors in the group pattern part 3042. The pattern is set for all of the three code symbols 3040a, 3040b, and 3040c.

In-Group Order Identification Data

In the example of FIG. 16(1), the in-group order identification data are "YMY", "MYM", and "MCM". Such color patterns indicative of the orders in the groups are assigned to in-group order display pattern parts 3044 in the code symbol. When the in-group order identification data having a configuration as shown in FIG. 16 is employed, it is necessary to express the orders in colors in advance.

Data Expression

In the example shown in FIG. 16(1), in each code symbol, a group pattern indicative of group identification data, data to be expressed, and in-group number order identification data is expressed in this order. In the case of the upper code symbol 3040a, the data to be expressed is 1048576 (in decimal), whose binary expression is shown in FIG. 16(1). Similarly, data to be expressed by the middle code symbol 3040b is 1 (in decimal), whose binary expression is shown in FIG. 16(1). Data to be expressed by the lower code symbol 3040c is 1398101 (in decimal), whose binary expression is shown in FIG. 16(1).

As a result, in the example shown in FIG. 16(1), data "1048576-1-1398101" is expressed.

Other Examples (a) FIG. 16(2) shows another example. In this example, data is divided into code symbols 3050a, 3050b, and 3050c which are recorded. The example of FIG. 16(2) is the same as that of FIG. 16(1) except for the point that the group identification data is "MCY", and the point that data to be expressed is data "1887436-524351-63".

(b) In the example shown in FIG. 17, data is divided into code symbols 3060a, 3060b, and 3060c which are recorded. The example of FIG. 17 is similar to the example of FIG. 16 in that the group identification data and the in-group order identification data are expressed by color patterns. In the example of FIG. 17, data to be expressed is data "1887436-524351-63" in a manner similar to the example of FIG. 16.

The example shown in FIG. 17 different from that of FIG. 16 in the "position" of the in-group order identification data. In the example shown in FIG. 17, in-group order identification data is described in an in-group order display pattern part 3062 which is about the center of the code symbol 3060.

As easily understood from the example of FIG. 17, in short, the in-group order identification data and the group identification data may be placed anywhere as long as it is determined in advance.

Embodiment 3-3

Erroneous Reading Prevention

In the case of the above examples (FIGS. 15 to 17), the reading process is performed on assumption that a plurality of code symbols exists. As described above, in the so-called 1D color bit code of the third embodiment, a code whose number of cells in a code symbol is not specified can also be used. The code has a start point and an end point designated by specific patterns. In the case where the specific patterns are detected, the detected patterns are recognized (determined) as the start point and the end point.

In the case where the number of cells in the code symbol is not determined in advance, there is a high possibility that, when an end of the code symbol cannot be captured due to, for example, the view field of a CCD camera, the remaining part may express another data (erroneous reading).

Embodiment 3-3a

Limitation of the Number of Cells in Symbol Code

In the Embodiment 3-3a, a method of preventing erroneous reading by limiting the number of cells in a code symbol is proposed.

The severest limitation is a constraint condition that all the code symbols have the same number of cells. By providing such a constraint, an unnecessarily redundant check cells can be avoided. A check cell is not a cell expressing data but is a cell for an error check. Check cells according to conventionally known techniques such as a parity and a CRC may be used.

Specifically, since all of the symbol lengths are the same, a code symbol whose end part cannot be partially captured due to out-of-view-field, hiding behind an obstacle, or other factors, is recognized that the number of cells is insufficient. Therefore, erroneous reading can be prevented (even if there is no check cell or the like).

In the examples of FIGS. 16 and 17, the constraint "all the code symbols have the same symbol length (number of cells)" is established, and the three code symbols in each of the examples have the same number of cells.

Embodiment 3-3b

Test of End-Point Condition

In some cases, the constraint "all the code symbols have the same symbol length (number of cells)" is too strict in practice.

To relax the use conditions in actual operation, it is also suitable to allow co-existence of a code symbol having N cells and a code symbol having N−1 cells, where N is a natural number.

In the case of establishing such a slightly relaxed constraint, when an end part of a code symbol having N−1 cells cannot be captured, decoding is regulated due to the cell number condition, and there is no possibility of erroneous reading. However, in this example, even when one cell in the end part of the code symbol having N cells cannot be captured, the code symbol of N−1 cells is allowed, and thus decoding constraint under the cell number condition is not applied. Consequently, there is a possibility of erroneous reading.

Therefore, in the embodiment 3-3b, detection of erroneous reading is examined not only based on the cell number condition but also based on an end-point condition.

Figure 18:
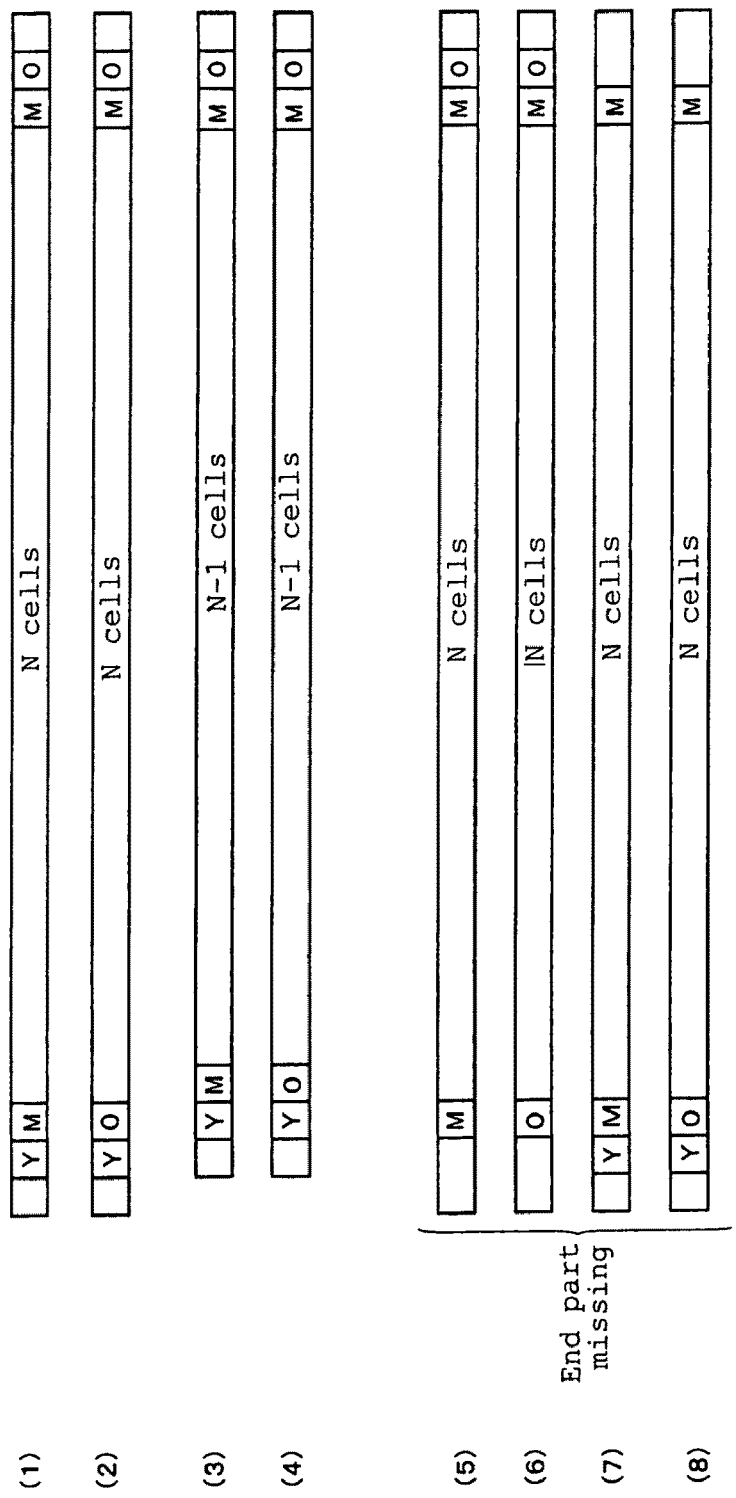
FIG. 18 is an explanatory diagram showing a state of code symbols in the case where a code symbol having N cells and a code symbol having N−1 cells are allowed to mixedly exist.

The end-point condition is determined that the color of an end-point cell at the left end is Y and the color of an end-point cell at the right end is C as shown in FIG. 18. Detection of erroneous reading in this case will be examined. In the present specification, end points are referred to as "left end" and "right end" which can also be substantially equivalently referred to as "start point" and "end point".

In FIG. 18, cells in thick frames are cells at end points. FIGS. 18(1) to (4) show examples of correct 1D color bit codes.

FIG. 18(1) shows the case where the number of cells is N and a cell neighboring to a Y cell at the left end is M. FIG. 18(2) shows the case where the number of cells is N like the case (1) and a cell neighboring to a Y cell at the left end is C.

FIG. 18(3) shows the case where the number of cells is N−1 and a cell neighboring to a Y cell at the left end is M. FIG. 18(4) shows the case where the number of cells is N−1 like the case (3) and a cell neighboring to a Y cell at the left end is C.

FIGS. 18(5) to (8) show states where missing occurs in an end part at the time of reading and correspond to FIGS. 18(1) to (4), respectively.

FIG. 18(5) shows a state where one cell (Y cell) at the left end is missing when the 1D color bit code of FIG. 18(1) is read. In this case, obviously, since the end-point conditions (the conditions that the left end is Y and the right end is C) are not satisfied (the left end is not Y cell), occurrence of erroneous reading can be detected. Also in the case where the 1D color bit code is read reversely, similarly, since the end-point conditions are not satisfied, erroneous reading can be detected.

FIG. 18(6) shows a state where one cell (Y cell) at the left end is missing when the 1D color bit code of FIG. 18(2) is read. In this case, obviously, since the end-point conditions (the conditions that the left end is Y and the right end is C) are not satisfied (the left end is not Y cell), occurrence of erroneous reading can be detected. Also in the case where the 1D color bit code is read reversely, similarly, since the end-point conditions are not satisfied, erroneous reading can be detected.

FIG. 18(7) shows a state where one cell (C cell) at the right end is missing when the 1D color bit code of FIG. 18(1) is read. In this case as well, since the end-point conditions are not satisfied (the right end is not C cell), occurrence of erroneous reading can be detected. Also in the case where the 1D color bit code is read from the opposite side, similarly, since the end-point conditions are not satisfied, erroneous reading can be detected.

FIG. 18(8) shows a state where one cell (C cell) at the right end is missing when the 1D color bit code of FIG. 18(2) is read. In this case as well, since the end-point conditions are not satisfied (the right end is not C cell), occurrence of erroneous reading can be detected. Also in the case where the 1D color bit code is read from the opposite side, similarly, since the end-point conditions are not satisfied, erroneous reading can be detected.

The condition of the end-part cell sequence in the 1D color bit code is that the right and left ends are always different from each other to distinguish the start and end points from each other. Therefore, in the case where one end of N cells cannot be captured as shown in FIG. 18, the end-part cell conditions (also referred to as end-point conditions) (in this example, the condition regarding Y and C, and the condition that change in the reading direction is not permitted) are not satisfied. That is, erroneous reading can be detected.

By considering the end-point conditions as well (for example, by employing the end-part cell sequence as shown in FIG. 18), even if a code symbol having N cells and a code symbol having N−1 cells co-exist, erroneous reading caused by missing of an end part can be prevented.

Co-Existence of Code Symbol Having N Cells and Code Symbol Having N−2 Cells

Figure 19:
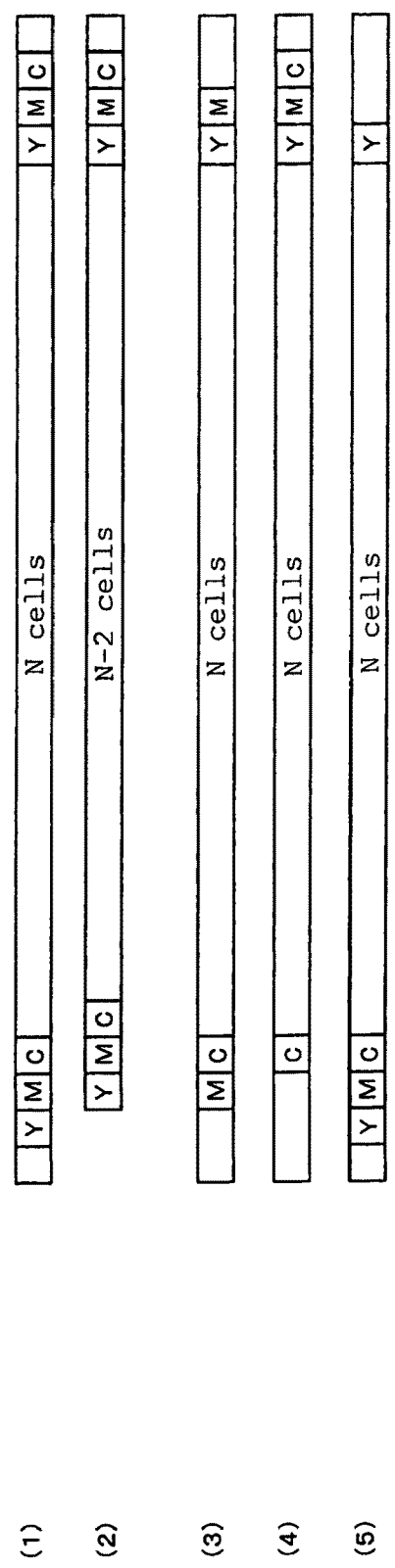
FIG. 19 is an explanatory diagram showing a state of code symbols in the case where a code symbol having N cells and a code symbol having N−2 cells are allowed to mixedly exist.

FIG. 19 shows a result of examination on detection of erroneous reading in the case where co-existence of a code symbol having N cells and a code symbol having N−2 cells is permitted.

The end-point conditions of the example shown in FIG. 19 are that YMC is at the left end (Y cell is at the left end) and YMC is at the right end (C cell is at the right end).

In the case of the end-point conditions, the end-part sequence condition includes the above-described conditions of the case of N cells and N−1 cells.

The example of FIG. 19 is similar to that of FIG. 18 when one cell at the left end and one cell at the right end are seen as follows:

| Condition of FIG. 18 | left end: Y | right end: C |
|---|---|---|
| Condition of FIG. 19 | left end: YMC | right end: YMC |

Therefore, also in the example of FIG. 19, erroneous reading in the case of co-existence of N cells and N−1 cells and reverse reading can be prevented in the same manner as in the example of FIG. 18.

In the case shown in FIG. 19, it can be understood that an end-point condition is extended to the inner side of the code symbol in addition to the example shown in FIG. 18. Specifically, at the left end, in addition to the Y cell, the M cell and the C cell are added to the inner side of the code symbol. At the right end, in addition to the C cell, the YM cells are added to the inner side of the code symbol.

By employing the end-point conditions, as shown in FIG. 19, the end-part cell sequence is always different from the original sequence in any of the cases that two cells at the ends are missing.

In FIG. 19(3), the Y cell at the left end and the C cell at the right end in the example of FIG. 17(1) are missing. Obviously, the end-point conditions are not satisfied whether the code symbol is read normally or reversely.

In FIG. 19(4), the YM cells at the left end in the example of FIG. 17(1) are missing. Obviously, the end-point conditions are not satisfied whether the code symbol is read normally or reversely.

In FIG. 19(5), the MC cells at the right end in the example of FIG. 17(1) are missing. Obviously, the end-point conditions are not satisfied whether the code symbol is read normally or reversely.

Therefore, in the case where two cells are missing in the code symbol having N cells, it can be always detected, and erroneous reading can be thus prevented.

In the case where one cell is missing in the code symbol having N cells or N−1 cells, as shown in FIG. 18, erroneous reading can be prevented.

In the case where two or more cells are missing in the code symbol having N−1 cells, the number of cells does not satisfy a specified requirement, occurrence of missing can thus be detected, and erroneous reading can be prevented.

Therefore, by using the end-part cell sequence as shown in FIG. 19 (by employing the end-point conditions), co-existence (flexibility) of code symbols having N to N−2 cells can be allowed.

Co-Existence of Code Symbol Having N Cells and Code Symbol Having N−3 Cells

Figure 20:
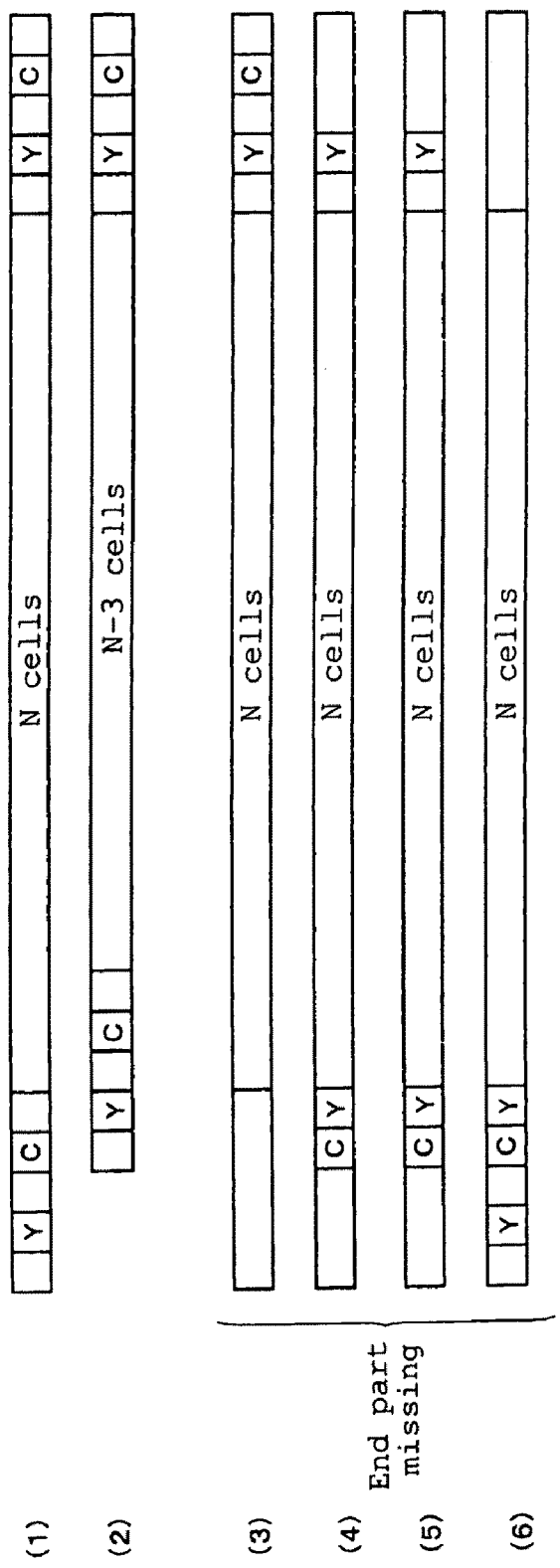
FIG. 20 is an explanatory diagram showing a state of code symbols in the case where a code symbol having N cells and a code symbol having N−3 cells are allowed to mixedly exist.

FIG. 20 shows an example of co-existence of a code symbol having N cells and a code symbol having N−3 cells.

The end-point conditions of the example shown in FIG. 20 are that YMCM is at the left end (Y cell is at the left end) and MYMC is at the right end (C cell is at the right end).

In the case of the end-point conditions, the end-part sequence conditions include the above-described conditions in the case of N cells and N−1 cells (the conditions of FIG. 18) and the conditions in the case of N cells and N−2 cells (the conditions of FIG. 19).

The example of FIG. 20 is similar to those of FIGS. 19 and 20 when only three cells at the left end and three cells at the right end are seen as follows

| Condition of FIG. 18 | left end: Y | right end: C |
| Condition of FIG. 19 | left end: YMC | right end: YMC |
| Condition of FIG. 20 | left end: YMCM | right end: MYMC |

Therefore, erroneous reading in the case of co-existence of N cells and N−1 cells and reverse reading therein can be prevented. In addition, erroneous reading in the case of co-existence of N cells and N−2 cells and reverse reading therein can be prevented in the same manner.

In the case shown in FIG. 20, it can be understood that an end-point condition is further extended to the inner side of the code symbol in addition to the examples shown in FIGS. 18 and 19. Specifically, at the left end, in addition to the Y cell, the M cell and the C cell are added to the inner side of the code symbol and, further, the M cell is added.

At the right end, in addition to the C cell, the YM cells are added to the inner side of the code symbol and, further, the M cell is added.

By employing the end-point conditions, as shown in FIG. 20, the end-part cell sequence is always different from the original sequence in any of the cases that three cells at the ends are missing.

In FIG. 20(3), the YMC cells at the left end in the example of FIG. 20(1) are missing. Obviously, the end-point conditions are not satisfied whether the code symbol is read normally or reversely.

In FIG. 20(4), the YM cells at the left end and the C cell at the right end in the example of FIG. 20(1) are missing. Obviously, the end-point conditions are not satisfied whether the code symbol is read normally or reversely.

In FIG. 20(5), the Y cell at the left end and the MC cells at the right end in the example of FIG. 20(1) are missing. Obviously, the end-point conditions are not satisfied whether the code symbol is read normally or reversely.

In FIG. 20(6), the YMC cells at the right in the example of FIG. 20(1) are missing. Obviously, the end-point conditions are not satisfied whether the code symbol is read normally or reversely.

Therefore, in the case where three cells are missing in the code symbol having N cells, it can be always detected, and erroneous reading can be thus prevented.

On the other hand, in the case where two cells are missing and in the case where one cell is missing, as described in FIGS. 18 and 19, occurrence of missing can be detected, and erroneous reading can be prevented.

Therefore, by using the end-part cell sequence as shown in FIG. 20 (by employing the end-point conditions), co-existence (flexibility) of code symbols having N to N−3 cells can be allowed.

Co-Existence of Code Symbol Having N Cells and Code Symbol Having N−4 Cells

Figure 21:
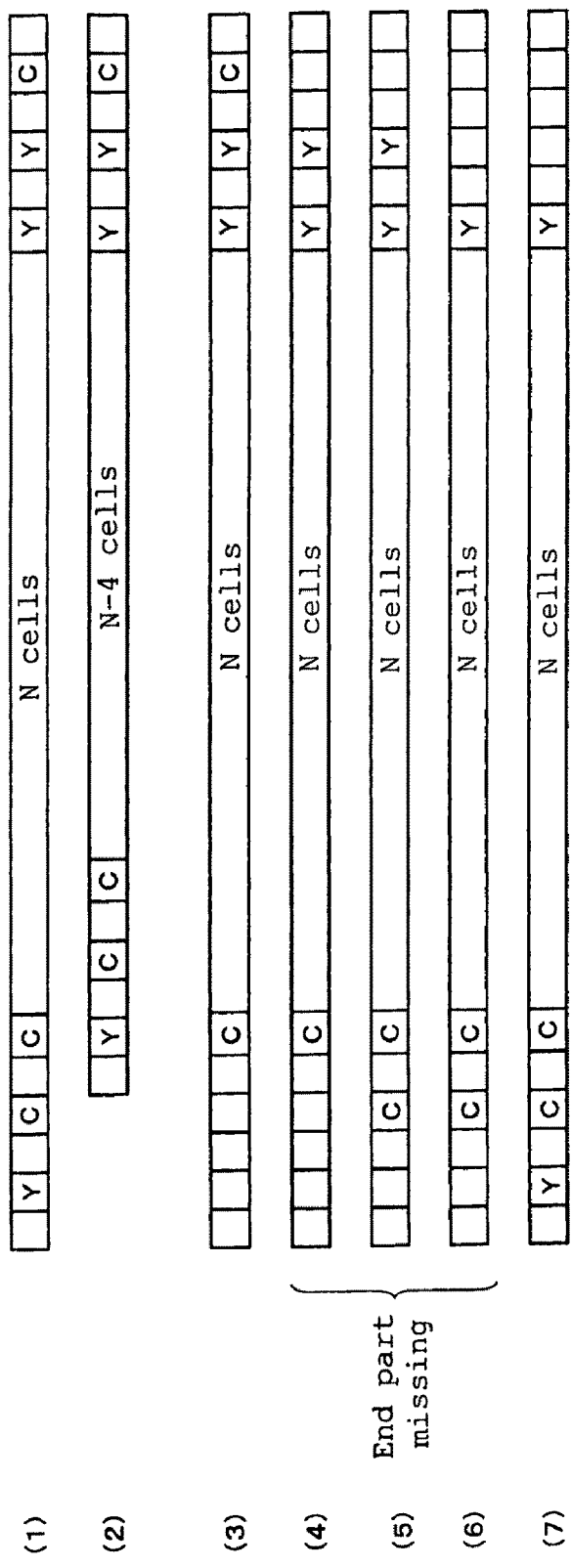
FIG. 21 is an explanatory diagram showing a state of code symbols in the case where a code symbol having N cells and a code symbol having N−4 cells are allowed to mixedly exist.

FIG. 21 shows an example of co-existence of a code symbol having N cells and a code symbol having N−4 cells.

The end-point conditions of the example shown in FIG. 21 are that YMCMC is at the left end (Y cell is at the left end) and YMYMC is at the right end (C cell is at the right end).

In the case of the end-point conditions, the end-part sequence conditions include the above-described conditions in the case of N cells and N−1 cells (the conditions of FIG. 18), the conditions in the case of N cells and N−2 cells (the condition of FIG. 19), and the conditions in the case of N cells and N−3 cells (the condition of FIG. 20).

The example of FIG. 21 is similar to that of FIG. 18 when only one cell at the left end and only one cell at the right end are seen as follows. Similarly, FIG. 21 includes the conditions of FIGS. 19 and 22.

| Condition of FIG. 18 | left end: Y | right end: C |
| Condition of FIG. 19 | left end: YMC | right end: YMC |
| Condition of FIG. 20 | left end: YMCM | right end: MYMC |
| Condition of FIG. 21 | left end: YMCMC | right end: YMYMC |

Therefore, erroneous reading in the case of co-existence of N cells and N−2 cells and reverse reading therein can be prevented. Similarly, erroneous reading in the case of co-existence of N cells and N−3 cells and reverse reading therein can be prevented.

In the case shown in FIG. 21, it can be understood that an end-point condition is further extended to the inner side of the code symbol in addition to the example shown in FIGS. 18, 19, and 20. Specifically, at the left end, in addition to the Y cell, the M cell and the C cell are added to the inner side of the code symbol and, further, the M cell and the C cell are added.

At the right end, in addition to the C cell, the MY cells are added to the inner side of the code symbol, further, the M cell is added and, further, the Y cell is added again.

FIG. 21(1) shows a code symbol of N cells satisfying the end point conditions. FIG. 21(2) shows a code symbol of N−4 cells satisfying the end point conditions.

By employing the end-point conditions, as shown in FIG. 21, the end-part cell sequence is always different from the original sequence in any of the cases that four cells at the ends are missing.

In FIG. 21(3), the YMCM cells at the left end in the example of FIG. 21(1) are missing. Obviously, the end-point conditions are not satisfied whether the code symbol is read normally or reversely.

In FIG. 21(4), the YMC cells at the left end and the C cell at the right end in the example of FIG. 21(1) are missing. Obviously, the end-point conditions are not satisfied whether the code symbol is read normally or reversely.

In FIG. 21(5), the YM cells at the left end and the MC cells at the right end in the example of FIG. 21(1) are missing. Obviously, the end-point conditions are not satisfied whether the code symbol is read normally or reversely.

In FIG. 21(6), the Y cell at the left end and the YMC cells at the right end in the example of FIG. 21(1) are missing. Obviously, the end-point conditions are not satisfied whether the code symbol is read normally or reversely.

In FIG. 21(7), the MYMC cells at the right end in the example of FIG. 21(1) are missing. Obviously, the end-point conditions are not satisfied whether the code symbol is read normally or reversely.

Therefore, by using the end-part cell sequence as shown in FIG. 21 (by employing the end-point conditions), co-existence (flexibility) of code symbols having N to N−4 cells can be allowed.

Summary 3-1

As is obvious inductively from FIG. 18, in the 1D color bit code (Japanese Patent Application No. 2006-196705) in which end-part identification color sequences are added at both ends a code symbol having N or N−1 cells arranged in three colors, to recognize that an end part is missing by placing the end-part identification color sequences at the right and left ends, it is sufficient to use sequences as described below as the end-part identification color sequences.

It is sufficient to place a first color as the sequence at the left end, and a second color as the sequence at the right end. The first and second colors are different from each other.

Obviously, when even one cell is missing at the right or left end, the end-point condition is not satisfied. This is because, in the 1D color bit code, different colors are always assigned to neighboring cells.

Even one cell is missing at the left end, the first color does not appear as either (left or right) of the end-point cells, and thus the end-point condition is not satisfied obviously (even in consideration of the case where the right and left cells are reversed). Similarly, even one cell is missing at the right end, the second color does not appear as either (left or right) of the end-point cells, and thus the end-point condition is not satisfied obviously (even in consideration of the case where the right and left cells are reversed). Therefore, when any one cell is missing, the end-point condition is not satisfied. Thus, erroneous reading can be accurately detected.

In the case of FIG. 18, if two or more cells are missing at an end part, the number of cells changes. Based on the number of cells, it can be determined that missing has occurred. In the case of FIG. 18, when missing of one cell at an end of a code symbol made of N cells can be recognized as "end-part missing" in terms of the end-point conditions, erroneous reading can be prevented.

Summary 3-2

As is obvious inductively from FIGS. 19, 20, and 21, by providing the end-part identification color sequences as described below at both right and left ends, occurrence of missing of a cell at the time of reading can be detected.

Specifically, such an end-part identification sequence is generated by the following steps (processes).

First Step

First, the first and second colors are placed at the left and right ends, thereby arranging the initial end-part identification sequences. Specifically, the initial sequence of the end-part identification sequence at the left end is made by one cell of the first color. The initial sequence of the end-part identification sequence at the right end is made by one cell of the second color. After that, cells are sequentially added to the end-part identification sequence by the following processes.

Second Step

In the case of allowing coexistence of code symbols having N to N−k cells, the following processes (a left-end-side process and a right-end-side process) are repeated k times. k is an integer of 2 or greater.

Code Symbol Left-End-Side Process

At the left end of a code symbol, if a cell at the right end of the end-part identification sequence, that is, a cell toward the inner side of the code symbol has the first or third color, a cell of the second color is newly placed. That is, a cell of the second color is added at the right end of the end-part identification sequence.

On the other hand, at the left end of a code symbol, if a cell at the right end of the end-part identification sequence, that is, a cell toward the inner side of the code symbol has the second color, a cell of the third color is newly placed. That is, a cell of the third color is added at the right end of the end-part identification sequence.

Code Symbol Right-End-Side Process

At the right end of a code symbol, if a cell at the left end of the end-part identification sequence, that is, a cell toward the inner side of the code symbol has the second or third color, a cell of the first color is newly placed. That is, a cell of the first color is added at the left end of the end-part identification sequence.

On the other hand, at the right end of a code symbol, if a cell at the right end of the end-part identification sequence, that is, a cell toward the inner side of the code symbol has the first color, a cell of the third color is newly placed. That is, a cell of the third color is added at the left end of the end-part identification sequence.

By such a process, at the left end of the code symbol, only the cell at the end has the first color, and "third color-second color-third color-second color" are repeatedly placed toward the inside of the code symbol. On the other hand, at the right end of the code symbol, only the cell at the end has the second color, and "third color-first color-third color-first color" are repeatedly placed toward the inside of the code symbol.

More accurately, the end-part identification color sequence generated by the process as described above is as follows.

In the case where the number of cells constructing a code symbol is N or less or N−k or more, the end-part identification color sequences for preventing erroneous reading are as follows when the number of colors used is three.

Left-Side End-Part Identification Color Sequence:

It is constructed by "first color cell+first repetition cell part". The end-point cell at the left end is a first color cell.

Right-Side End-Part Identification Color Sequence:

It is constructed by "second repetition cell part+second color cell". The end-point cell at the left end is a second color cell.

The first repetition cell part is constructed by alternately connecting a third color cell and a second color cell from the left end side toward the inside of the code symbol. The total number of cells connected is k.

The second repetition cell part is constructed by alternately connecting a third color cell and a first color cell from the right end side toward the inside of the code symbol. The total number of cells connected is k.

N is a natural number, and k is an integer of 1 or greater and less than N.

The cases of FIG. 19 (k=2), FIG. 20 (k=3), and FIG. 21 (k=4) are schematically shown as follows:

| FIG. 19 | left end: YMC | right end: YMC |
| FIG. 20 | left end: YMCM | right end: MYMC |
| FIG. 21 | left end: YMCMC | right end: YMYMC |

Specifically, in the examples of FIGS. 19 to 21, the first color is Y, the second color is C, and the third color is M. In those examples, the first color is Y, the second color is C, and the third color is M. Although such a combination is shown here, another combination and other colors may be used.

When the end-part identification color sequences shown in "summary 3-2" are used, missing of k cells in a code symbol made of N cells can be detected in the case where code symbols having N to N−k cells exist mixedly.

Missing of k Cells

First, when k cells are missing at the left end, the first color does not appear at the end. Consequently, the end-point condition is not satisfied, and occurrence of "missing" can be detected. As is obvious from the above description, when the k cells are missing at the left end, the cell at the left end becomes the second or third color. On the other hand, the cell at the right end remains having the second color. Therefore, obviously, the end-point condition is not satisfied.

In the case where k cells are missing at the right end, the second color does not appear at the end. In this case as well, the end-point condition is not obviously satisfied, and occurrence of "missing" can be detected. As obvious from the above description, when the k cells are missing at the right end, the cell at the right end becomes the first or third color. On the other hand, the cell at the left end remains having the first color. Therefore, obviously, the end-point condition is not satisfied.

In the case where one or more cells are missing at the left end, one or more cells are missing at the right end, and total k cells are missing, a cell of the first color does not appear at neither of right and left ends. As a result, it can be detected that the end-point conditions are not satisfied, some cell is missing, and erroneous reading has occurred.

Missing of One to "k−1" Cells

The end-part identification color sequence proposed in the embodiment is inductively constructed. Since the sequence in the case of k includes a sequence of k−1, naturally, missing of k−1 cells can be detected. Since the k−1 sequence also includes a k−2 sequence, missing of k−2 cells can also be detected naturally. Similarly, missing of any number from one to k−1 cells can be detected.

Inductive explanation has been given above. However, it is intuitively obvious that when one or more cells are missing at the left end, one or more cells are missing at the right end, and the total number of the missing cells is k or less, a cell of the first color does not appear at the ends, and the end-point conditions are not satisfied. It can be understood that, as a result, occurrence of erroneous reading and missing of cells can be detected.

Embodiment 3-4

Other Examples (Erroneous Reading Prevention 2)

Other various examples of the method described in Embodiment 3-3 will be described.

Another Example 3-1

Figure 22:
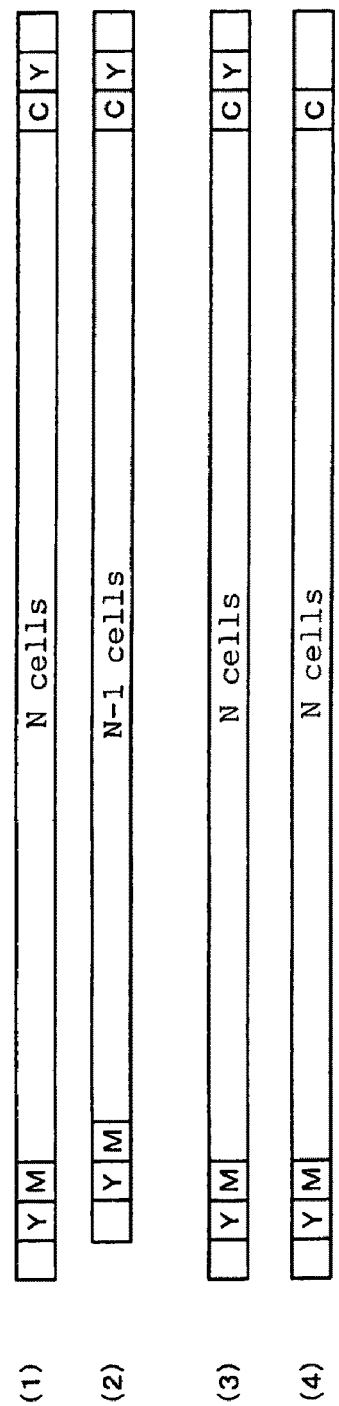
FIG. 22 is an explanatory diagram of an optical recognition code of another example 3-1.

FIG. 22 shows an example where the end-point conditions are set as follows:
Left end: YM (Y cell is at the left end)
Right end: CY (Y cell is at the right end)
In the example, the end-point conditions capable of detecting one missing in a code symbol made of N cells under the circumstance that co-existence of a code symbol of N cells and a code symbol of N−1 cells is permitted are proposed (the end-part identification sequences are proposed).

It is obvious from FIG. 22 that, in the case where no missing of cells occurs, the cells at both ends are Y cells. If missing of one cell occurs at one of the right and left ends, a cell in at least one of the right and left ends does not become Y, and the end-point conditions that the cells at both ends are Y are not satisfied.

FIG. 22(1) shows a code symbol made of N cells satisfying the end-point conditions. FIG. 22(2) shows a code symbol made of N−1 cells satisfying the end-point conditions.

FIG. 22(3) shows a code symbol having N−1 cells as a result that one cell on the left side of a code symbol made of N cells is missing. FIG. 22(4) shows a code symbol having N−1 cells as a result that one cell on the right side of the code symbol made of N cells is missing.

As obvious from FIGS. 22(3) and (4), in the case where one cell is missing, the end-point conditions are not satisfied whether the code symbol is read normally or reversely.

Therefore, when the end-part identification sequences shown in FIG. 22 are used, the case of occurrence of missing of one cell in a code symbol made of N cells can be detected under the circumstance that co-existence of a code symbol of N cells and a code symbol of N−1 cells is permitted.

The example of FIG. 22 can be generalized and described as follows:
Left end: first color, third color
Right end: second color, first color
(in either end, the first color is at the end-part cell)
In the example of FIG. 22, Y is used as the first color, C is used as the second color, and M is used as the third color. Obviously, however, it is also preferable to assign other colors and use other color combinations.

Another Example 3-2

Figure 23:
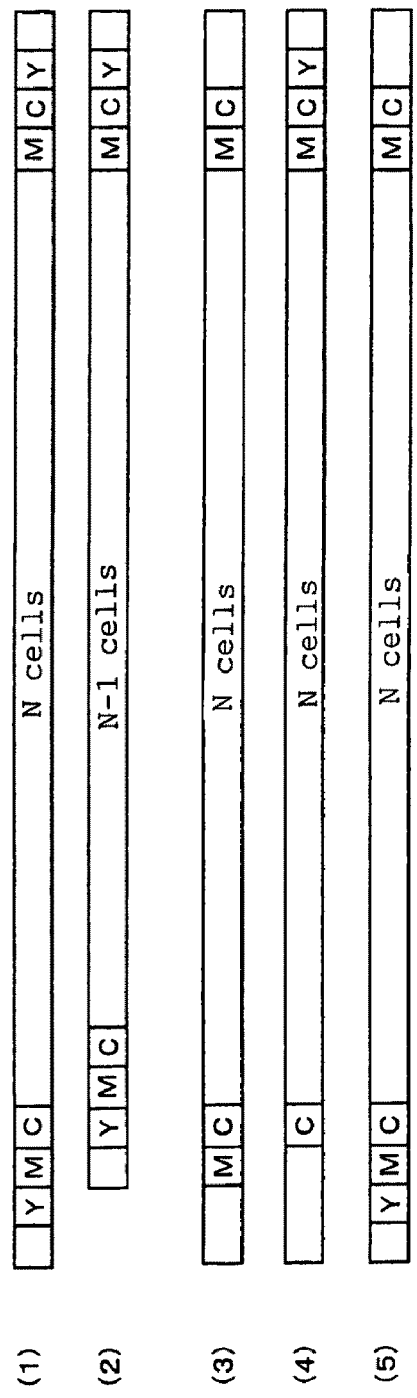
FIG. 23 is an explanatory diagram of an optical recognition code of another example 3-2.

FIG. 23 shows an example where the end-point conditions are set as follows:
Left end: YMC (Y cell is at the left end)
Right end: MCY (Y cell is at the right end)
In the example, similarly to FIG. 19, the end-point conditions capable of detecting two missing cells in a code symbol made of N cells under the circumstance that co-existence of a code symbol of N cells and a code symbol of N−2 cells is permitted are proposed (the end-part identification sequences are proposed).

Like the end-part identification sequences described above, the example of FIG. 23 employs the arrangement where one cell is added to each of the sides in the inner side direction of the end-part identification sequence of the example of FIG. 22. One cell is added to each of the right and left sides.

FIG. 23(1) shows an example where the end-part identification sequences are provided in a code symbol made of N cells. FIG. 23(2) shows an example where the end-part identification sequences are provided in a code symbol made of N−1 cells.

FIGS. 23(3), (4), and (5) show a state where missing of two cells occurs in a code symbol made of N cells. FIGS. 23(3), (4), and (5) show a case where one cell is missing in each of the right and left sides, a case where two cells are missing at the left end, and a case where two cells are missing at the right end, respectively.

As obvious from FIGS. 23(1) to (5), in the case where cell missing does not occur, cells at both ends are Y cells. However, when missing of two cells occurs in one or both of the right and left ends as shown in FIGS. 23(3), (4), and (5), at least one of the cells at the right and left ends does not become Y, and the end-point conditions that cells at both ends are Y are not satisfied.

Therefore, when the end-part identification sequences shown in FIG. 23 are used, the case of occurrence of missing of two cells in a code symbol made of N cells can be detected under the circumstance that co-existence of a code symbol of N cells and a code symbol of N−2 cells is permitted.

The example of FIG. 23 can be generalized and described as follows:
Left end: first color, third color, second color
Right end: third color, second color, first color
(at either end, the first color is at the end-part cell)

In the example of FIG. 23, Y is used as the first color, C is used as the second color, and M is used as the third color. Obviously, however, it is also preferable to assign other colors and use other color combinations.

Another Example 3-3

Figure 24:
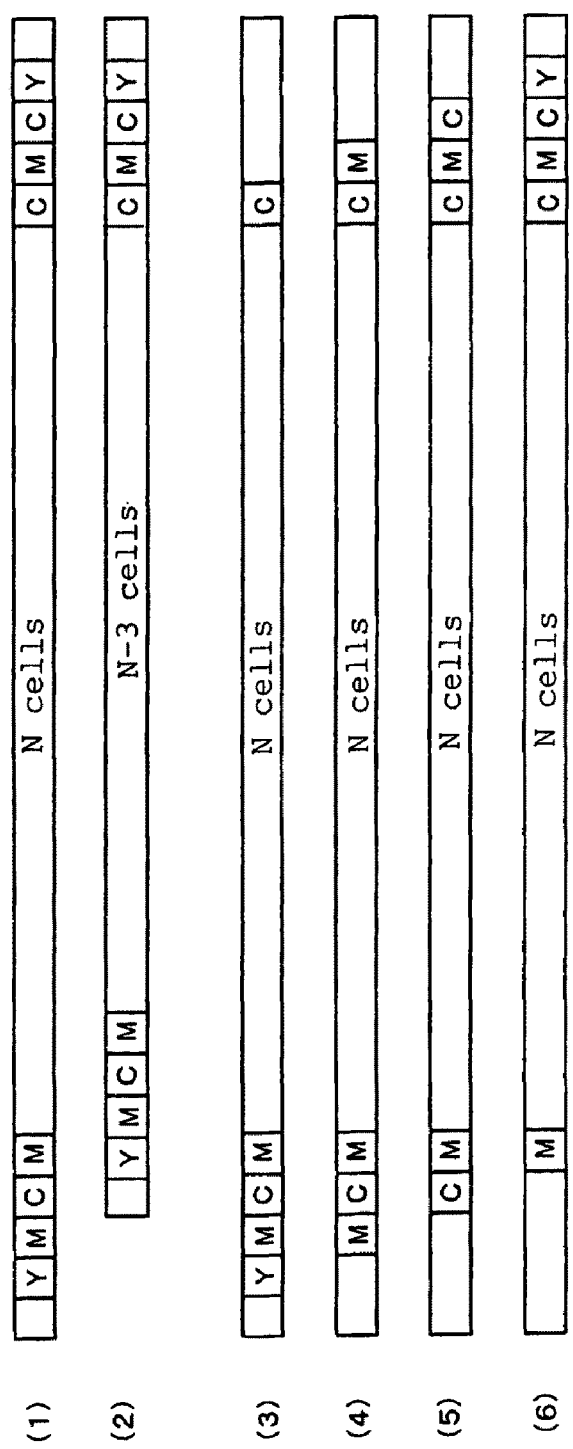
FIG. 24 is an explanatory diagram of an optical recognition code of another example 3-3.

FIG. 24 shows an example where the end-point conditions are set as follows:
Left end: YMCM (Y cell is at the left end)
Right end: CMCY (Y cell is at the right end)
In the example, similarly to FIG. 20, the end-point conditions capable of detecting three missing cells in a code symbol made of N cells under the circumstance that co-existence of a code symbol of N cells and a code symbol of N–3 cells is permitted are proposed (the end-part identification sequences are proposed).

Like the end-part identification sequences described above, the example of FIG. 24 employs the arrangement where one cell is added to each of the sides in the inner side direction of the end-part identification sequence of the example of FIG. 23. One cell is added to each of the right and left sides.

FIG. 24(1) shows an example where the end-part identification sequences are provided in a code symbol made of N cells. FIG. 24(2) shows an example where the end-part identification sequences are provided in a code symbol made of N–3 cells.

FIGS. 24(3), (4), (5), and (6) show a state where missing of three cells occurs in a code symbol made of N cells. FIGS. 24(3), (4), (5), and (6) show a case where three cells are missing at the right end, a case where two cells are missing at the right end and one cell is missing at the left end, a case where one cell is missing at the right end and two cells are missing at the left end, and a case where three cells are missing at the left end, respectively.

As obvious from FIGS. 24(1) to (6), in the case where cell missing does not occur, cells at both ends are Y cells. However, when missing of three cells occurs in one or both of the right and left ends as shown in FIGS. 24(3), (4), (5), and (6), at least one of the cells at the right and left ends does not become Y, and the end-point conditions that cells at both ends are Y are not satisfied.

Therefore, when the end-part identification sequences shown in FIG. 24 are used, the case of occurrence of missing of three cells in a code symbol made of N cells can be detected under the circumstance that co-existence of a code symbol of N cells and a code symbol of N–3 cells is permitted.

The example of FIG. 24 can be generalized and described as follows:
Left end: first color, third color, second color, third color (the first color is at the end-part cell)
Right end: second color, third color, second color, first color (the first color is at the end-part cell)

In the example of FIG. 24, Y is used as the first color, C is used as the second color, and M is used as the third color. Obviously, however, it is also preferable to assign other colors and use other color combinations.

Another Example 3-4

Figure 25:
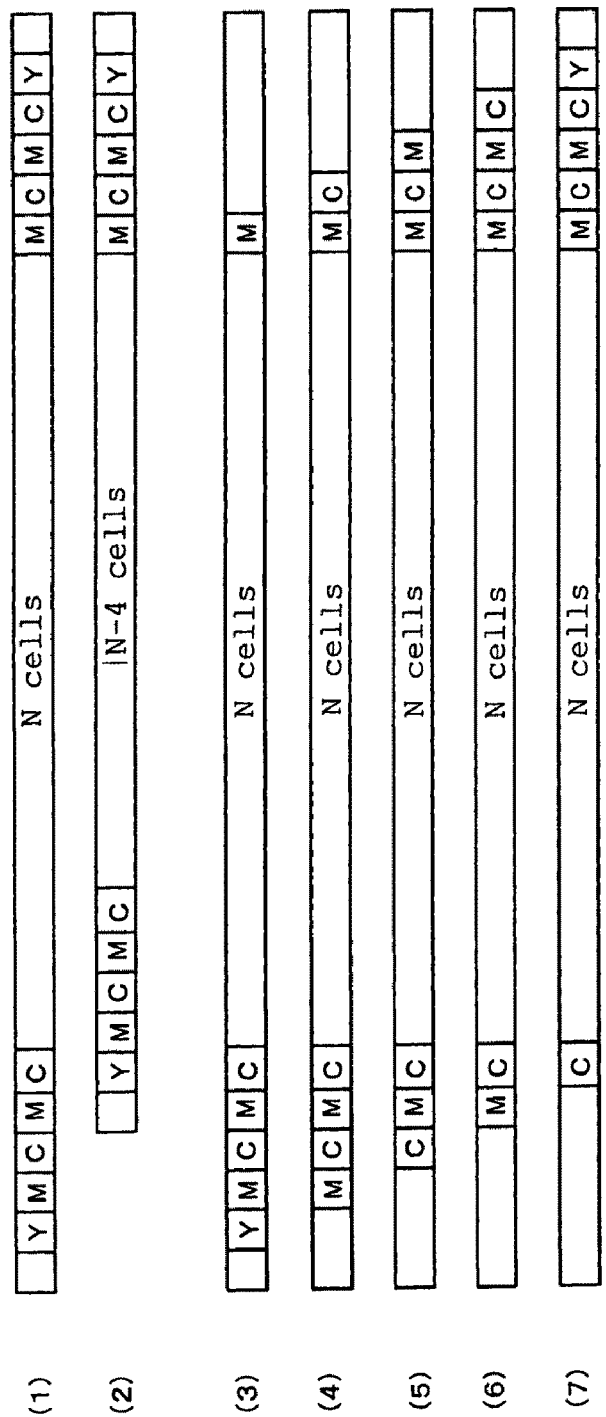
FIG. 25 is an explanatory diagram of an optical recognition code of another example 3-4.
Figure 26:
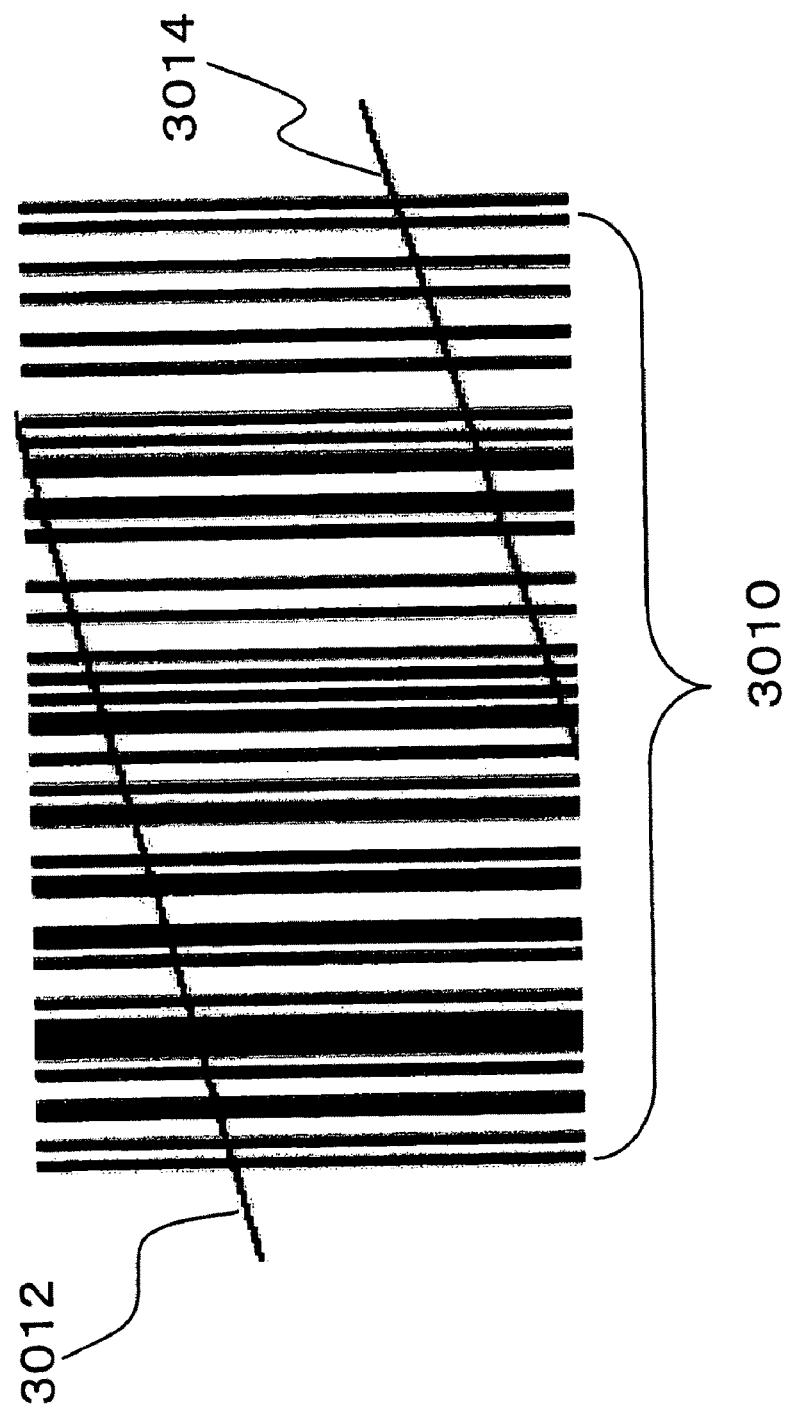
FIG. 26 is an explanatory diagram showing a state of reading a conventional barcode with a plurality of scan lines.

FIG. 25 shows an example where the end-point conditions are set as follows:
Left end: YMCMC (Y cell is at the left end)
Right end: MCMCY (Y cell is at the right end)
In the example, similarly to FIG. 21, the end-point conditions capable of detecting four missing cells in a code symbol made of N cells under the circumstance that co-existence of a code symbol of N cells and a code symbol of N–4 cells is permitted are proposed (the end-part identification sequences are proposed).

Like the end-part identification sequences described above, the example of FIG. 25 employs the arrangement where one cell is added to each of the sides in the inner side direction of the end-part identification sequence of the example of FIG. 24. One cell is added to each of the right and left sides.

FIG. 25(1) shows an example where the end-part identification sequences are provided in a code symbol made of N cells. FIG. 25(2) shows an example where the end-part identification sequences are provided in a code symbol made of N–4 cells.

FIGS. 25(3), (4), (5), (6), and (7) show a state where missing of four cells occurs in a code symbol made of N cells. FIGS. 25(3), (4), (5), (6), and (7) show a case where four cells are missing at the right end, a case where three cells are missing at the right end and one cell is missing at the left end, a case where two cells are missing at the right end and two cells are missing at the left end, a case where one cell is missing at the right end and three cells are missing at the left end, and a case where four cells are missing at the left end, respectively.

As obvious from FIGS. 25(1) to (7), in the case where cell missing does not occur, cells at both ends are Y cells. However, when missing of total four cells occurs in one or both of the right and left ends as shown in FIGS. 25(3), (4), (5), (6), and (7), at least one of the cells at the right and left ends does not become Y, and the end-point conditions that cells at both ends are Y are not satisfied.

Therefore, when the end-part identification sequences shown in FIG. 25 are used, the case of occurrence of missing of four cells in a code symbol made of N cells can be detected under the circumstance that co-existence of a code symbol of N cells and a code symbol of N–4 cells is permitted.

The example of FIG. 25 can be generalized and described as follows:
Left end: first color, third color, second color, third color, second color (the first color is at the end-part cell)
Right end: third color, second color, third color, second color, first color (the first color is at the end-part cell)

In the example of FIG. 25, Y is used as the first color, C is used as the second color, and M is used as the third color. Obviously, however, it is also preferable to assign other colors and use other color combinations.

Summary 3-3

As is obvious inductively from FIGS. 22, 23, 24, and 25, by providing the end-part identification color sequences as described below at both right and left ends, occurrence of missing of a cell at the time of reading can be detected.

Specifically, such an end-part identification sequence is generated by the following steps (processes).

First Step

First, the first color is placed at the left and right ends, thereby arranging the initial end-part identification sequences. Specifically, the initial sequence of the end-part identification sequence at the left end is made by one cell of the first color. The initial sequence of the end-part identification sequence at the right end is made by one cell of the first color. After that, cells are sequentially added to the end-part identification sequence by the following processes.

Second Step

In the case of allowing coexistence of code symbols having N to N−k cells, the following processes (a left-end-side process and a right-end-side process) are repeated k times. k is an integer of 1 or greater.

Code Symbol Left-End-Side Process

At the left end of a code symbol, if a cell at the right end of the end-part identification sequence, that is, a cell toward the inner side of the code symbol has the first or third color, a cell of the second color is newly placed. That is, a cell of the second color is added at the right end of the end-part identification sequence.

On the other hand, at the left end of a code symbol, if a cell at the right end of the end-part identification sequence, that is, a cell toward the inner side of the code symbol has the second color, a cell of the third color is newly placed. That is, a cell of the third color is added at the right end of the end-part identification sequence.

Code Symbol Right-End-Side Process

At the right end of a code symbol, if a cell at the left end of the end-part identification sequence, that is, a cell toward the inner side of the code symbol has the first or second color, a cell of the third color is newly placed. That is, a cell of the third color is added at the left end of the end-part identification sequence.

On the other hand, at the right end of a code symbol, if a cell at the right end of the end-part identification sequence, that is, a cell toward the inner side of the code symbol has the third color, a cell of the second color is newly placed. That is, a cell of the second color is added at the left end of the end-part identification sequence.

By such a process, at the left end of the code symbol, only the cell at the end has the first color, and "second color-third color-second color-third color" are repeatedly placed toward the inside of the code symbol. On the other hand, at the right end of the code symbol, only the cell at the end has the first color, and "third color-first color-third color-first color" are repeatedly placed toward the inside of the code symbol.

More accurately, the end-part identification color sequence generated by the process as described above is as follows.

In the case where the number of cells constructing a code symbol is N or less or N−k or more, the end-part identification color sequences for preventing erroneous reading are as follows when the number of the colors used is three.

Left-Side End-Part Identification Color Sequence:

It is constructed by "first color cell+first repetition cell part". The end-point cell at the left end is a first color cell.

Right-Side End-Part Identification Color Sequence

It is constructed by "second repetition cell part+first color cell". The end-point cell at the left end is a first color cell.

The first repetition cell part is constructed by alternately connecting a second color cell and a third color cell from the left end side toward the inside of the code symbol. The total number of cells connected is k.

The second repetition cell part is constructed by alternately connecting a third color cell and a second color cell from the right end side toward the inside of the code symbol. The total number of cells connected is k.

N is a natural number, and k is an integer of 1 or greater and less than N.

k corresponds to the case where the color repetition is repeated k times at both ends except for the end parts.

The examples of FIG. 22 (k=1), FIG. 23 (k=2), FIG. 24 (k=3), and FIG. 25 (k=4) are schematically shown as follows:

| FIG. 22 | left end: YM | right end: CY |
| FIG. 23 | left end: YMC | right end: MCY |
| FIG. 24 | left end: YMCM | right end: YMCY |
| FIG. 25 | left end: YMCMC | right end: MYMYC |

Specifically, in the examples of FIGS. 22 to 25, the first color is Y, the second color is M, and the third color is C. Obviously, another combination and other colors may be used.

When the end-part identification color sequence shown in "summary 3-3" is used, missing of k cells in a code symbol made of N cells can be detected in the case where code symbols having N to N−k cells N to N−k exist mixedly.

Missing of k Cells

First, when k cells are missing at the left end, the first color does not appear at the end. Consequently, the end-point condition is not satisfied obviously and occurrence of "missing" can be detected. As is obvious from the above description, when the k cells are missing at the left end, the cell at the left end becomes the second or third color. On the other hand, the cell at the right end remains having the first color. Therefore, obviously, the end-point condition is not satisfied.

In the case k cells are missing at the right end, the right end is not in the first color. In this case as well, the end-point condition is not obviously satisfied, and occurrence of "missing" can be detected. As obvious from the above description, when the k cells are missing at the right end, the cell at the right end becomes the second or third color. On the other hand, the cell at the left end remains having the first color. Therefore, obviously, the end-point condition is not satisfied.

In the case where one or more cells are missing at the left end, one or more cells are missing at the right end, and total k cells are missing, a cell of the first color does not appear at neither of right and left ends. As a result, it can be detected that the end-point conditions are not satisfied, some cell is missing, and erroneous reading has occurred.

Missing of One to "k−1" Cells

The end-part identification color sequences described in the other examples 3-1 to 3-4 are inductively constructed. Since the sequence in the case of k includes a sequence of k−1, naturally, missing of k−1 cells can be also detected. Since the k−1 sequence also includes a k−2 sequence, missing of k−2 cells can also be detected naturally. Similarly, missing of any number from one cell to k−1 cells can be detected.

Inductive explanation has been given above. However, it is intuitively obvious that when one or more cells are missing at the left end, one or more cells are missing at the right end, and the total number of the missing cells is k or less, a cell of the first color does not appear at the ends, and the end-point conditions are not satisfied. As a result, occurrence of erroneous reading and missing of cells can be detected.

Others

As described above, the present invention has an aspect of restoring original data using a plurality of code symbols but is not limited thereto. Obviously, the invention can also be applied to the case of reading a plurality of code symbols independently of each other.

When the case of restoring original data using a plurality of code symbols is considered, it is preferable to set a plurality of code symbols so that each of them has some meaning (such as date, serial number, price, and the like). Thus, even in the case where the original data cannot be restored completely for some reason, the circumstances can be made more significant for counting and the like.

Embodiment 3-5 and Others (1) Obviously, the invention of detecting "missing" in reading by the end-point conditions, that is, the end-part identification color sequences can be applied not only to the case of expressing predetermined single data by a plurality of code symbols but also to the case of expressing single data by a single code symbol.

(2) Preferably, image data is captured by a CCD camera or the like in a typical manner. Data captured by an analog camera can be converted to a digital signal.

The abstract of the application relates mainly to the first embodiment. For example, abstracts of the second and third embodiments are as follows:

Abstract of Second Embodiment

An object of the invention is to provide an easier cutout method utilizing features of the 1D color bit code devised by the inventors of the present invention, resistive to distortion, blurring, variations, and the like of the dimension and shape, and different from a conventional 2D barcode.

First, the image data including the 1D color bit code is captured by an area sensor. The image data is divided into a plurality of color areas based on the definition. Whether or not each of the divided areas is a cell as a component of the 1D color bit code is determined using a boundary condition, a condition of the number of cells, a terminating end condition, or the like. Finally, decoding is actually performed and whether the decoding can be performed without an error or not is checked. When the decoding can be performed finally accurately as described above, the result is output as a result of final cutout, or a result of the decoding. Therefore, the 1D color bit can be decoded without using a cutout mark or the like.

Abstract of Third Embodiment

The present invention is to provide an optical recognition code in which data to be expressed is expressed by a plurality of code symbols. The invention provides an optical recognition code, in the case where coexistence of code symbols having different numbers of cells is permitted, capable of detecting the missing in reading and preventing erroneous recognition even if missing in reading occurs at the end parts.

Predetermined data is expressed by a plurality of code symbols. Each of the code symbols includes: group identification data for identifying a group of a plurality of code symbols and in-group order identification data indicative of order in the group.

The end-part identification color sequence is provided at each of the right and left end parts of a code symbol. When missing occurs in reading, the end-part identification color sequence is destroyed, and occurrence of the missing can be detected. Thus, erroneous reading can be prevented.

What is claimed is:

1. An optical recognition code recognizing apparatus for recognizing an optical recognition code, comprising:
   means for dividing image data obtained by imaging an optical recognition code into color areas based on parameters indicative of colors; and
   means for determining whether each of the divided color areas is a cell that is a component of the optical recognition code or not, wherein
   the image data is constructed by data indicative of a color including a hue, and a parameter indicative of a color is the hue.

2. An optical recognition code recognizing apparatus for recognizing an optical recognition code, comprising:
   means for dividing image data obtained by imaging an optical recognition code into color areas based on parameters indicative of colors; and
   means for determining whether each of the divided color areas is a cell that is a component of the optical recognition code or not, wherein
   the means for dividing performs an imaging process of enlarging an area on each of the areas obtained by division.

3. An optical recognition code recognizing apparatus for recognizing an optical recognition code, comprising:
   means for dividing image data obtained by imaging an optical recognition code into color areas based on parameters indicative of colors; and
   means for determining whether each of the divided color areas is a cell that is a component of the optical recognition code or not, wherein
   the means for dividing performs an imaging process of reducing an area on each of the areas obtained by division.

4. An optical recognition code recognizing apparatus for recognizing an optical recognition code, comprising:
   means for dividing image data obtained by imaging an optical recognition code into color areas based on parameters indicative of colors; and
   means for determining whether each of the divided color areas is a cell that is a component of the optical recognition code or not, wherein
   the means for dividing converts the image data to N values based on the parameters indicative of colors, and dividing the image data into color areas based on the values, where N is a positive integer.

5. The optical recognition code recognizing apparatus according to claim 4, wherein the means for determining cuts out a pattern of a single ID color bit code or a plurality of 1D color bit codes based on only an arrangement manner of the areas from each of the areas obtained by the division.

6. An optical recognition code recognizing apparatus for recognizing an optical recognition code, comprising:
   means for dividing image data obtained by imaging an optical recognition code into color areas based on parameters indicative of colors; and
   means for determining whether each of the divided color areas is a cell that is a component of the optical recognition code or not, wherein
   the means for dividing divides the image data into an area of one or more colors constructing a marking pattern and an area of a color indicative of a quiet zone, and
   the color indicative of the quiet zone is a space color other than the colors constructing the marking pattern.

7. The optical recognition code recognizing apparatus according to claim 6,
   wherein, when a target area satisfies any of the following conditions, the means for determining determines that the target area is a candidate of a cell as a component of a color bit code:
   intermediate cell condition "a": other four areas are neighboring around the target area, and colors of the other four areas are space color-another color-space color-another color in the circumferential direction around the target area as a center; and
   end cell condition "b": two other areas are neighboring around the target area, and colors of the other two areas are a space color and another color, and
   the another color is another color as a component of the marking pattern, different from the color of the target area.

8. The optical recognition code recognizing apparatus according to claim 7, wherein the means for determining regards, as a color bit code, a group of color areas estimated as a color bit code made of candidates of cells constructing a color bit code, and decodes the color bit code to obtain original data.

9. The optical recognition code recognizing apparatus according to claim 8, wherein, when a plurality of groups of color areas estimated as color bit codes each made of candidates of cells constructing a color bit code exist, the means for determining decodes each of the groups of areas as a color bit code and decode each color bit code to obtain original data.

10. The optical recognition code recognizing apparatus according to claim 6, wherein the space color indicating the quiet zone is white or black.

11. An optical recognition code recognizing apparatus for recognizing an optical recognition code, comprising:
means for dividing image data obtained by imaging an optical recognition code into color areas based on parameters indicative of colors; and
means for determining whether each of the divided color areas is a cell that is a component of the optical recognition code or not, wherein,
when the number of cells constructing a 1D color bit code in the case where a target area is assumed to be a cell as a component of the 1D color bit code coincides with a predetermined number, the means for determining determines that the target area is a candidate of a cell as a component of a color bit code.

12. An optical recognition code recognizing apparatus for recognizing an optical recognition code, comprising:
means for dividing image data obtained by imaging an optical recognition code into color areas based on parameters indicative of colors; and
means for determining whether each of the divided color areas is a cell that is a component of the optical recognition code or not, wherein,
when a start point and an end point of a 1D color bit code are detected and one or more cells constructing the start point and one or more cells constructing the end point coincide with predetermined colors of the start and end points in the case where a target area is assumed to be a cell as a component of the 1D color bit code, the means for determining determines that the target area is a candidate of a cell as a component of a color bit code.

13. An optical recognition code recognizing apparatus for recognizing an optical recognition code, comprising:
means for dividing image data obtained by imaging an optical recognition code into color areas based on parameters indicative of colors; and
means for determining whether each of the divided color areas is a cell that is a component of the optical recognition code or not, wherein,
when an intermediate point of a 1D color bit code is detected and one or more cells constructing the intermediate point coincide with a predetermined color of the intermediate point in the case where a target area is assumed to be a cell as a component of the 1D color bit code, the means determining determines that the target area is a candidate of a cell as a component of a color bit code.

14. A non-transitory computer readable medium storing a program for making a computer operate as an optical recognition code recognizing apparatus for recognizing an optical recognition code, wherein the computer is made execute:

a dividing procedure for dividing image data obtained by imaging an optical recognition code into color areas based on parameters indicative of colors; and
a determining procedure for determining whether each of the divided color areas is a cell that is a component of the optical recognition code or not, wherein
the image data is constructed by data indicative of a color including a hue, and a parameter indicative of a color is the hue.

15. A non-transitory computer readable medium storing a program for making a computer operate as an optical recognition code recognizing apparatus for recognizing an optical recognition code, wherein the computer is made execute:
a dividing procedure for dividing image data obtained by imaging an optical recognition code into color areas based on parameters indicative of colors; and
a determining procedure for determining whether each of the divided color areas is a cell that is a component of the optical recognition code or not, wherein,
in the dividing procedure, an imaging process of enlarging an area is executed on each of the areas obtained by division.

16. A non-transitory computer readable medium storing a program for making a computer operate as an optical recognition code recognizing apparatus for recognizing an optical recognition code, wherein the computer is made execute:
a dividing procedure for dividing image data obtained by imaging an optical recognition code into color areas based on parameters indicative of colors; and
a determining procedure for determining whether each of the divided color areas is a cell that is a component of the optical recognition code or not, wherein,
in the dividing procedure, an imaging process of reducing an area is executed on each of the areas obtained by division.

17. A non-transitory computer readable medium storing a program for making a computer operate as an optical recognition code recognizing apparatus for recognizing an optical recognition code, wherein the computer is made execute:
a dividing procedure for dividing image data obtained by imaging an optical recognition code into color areas based on parameters indicative of colors; and
a determining procedure for determining whether each of the divided color areas is a cell that is a component of the optical recognition code or not, wherein,
in the dividing procedure, the image data is converted to N values based on the parameters indicative of colors, and the image data is divided into color areas based on the values,
where N is a positive integer.

18. The program non-transitory computer readable medium according to claim 17, wherein, in the determining procedure, a pattern of a single 1D color bit code or a plurality of 1D color bit codes is cut out based on only an arrangement manner of the areas from each of the areas obtained by the division.

19. A non-transitory computer readable medium storing a program for making a computer operate as an optical recognition code recognizing apparatus for recognizing an optical recognition code, wherein the computer is made execute:
a dividing procedure for dividing image data obtained by imaging an optical recognition code into color areas based on parameters indicative of colors; and
a determining procedure for determining whether each of the divided color areas is a cell that is a component of the optical recognition code or not, wherein, in the dividing procedure, the image data is divided into an area of one or more colors constructing a marking pattern and an area of a color indicative of a quiet zone, and the color indicative of the quiet zone is a space color other than the colors constructing the marking pattern.

20. The program according to claim 19,
wherein, in the determining procedure, when a target area satisfies any of the following conditions, it is determined that the target area is a candidate of a cell as a component of a color bit code:
  intermediate cell condition "a": other four areas are neighboring around the target area, and colors of the other four areas are "space color-another color-space color-another color" in the circumferential direction around the target area as a center; and
  end cell condition "b": two other areas are neighboring around the target area, and colors of the other two areas are a space color and another color, and
  the another color is another color as a component of the marking pattern, different from the color of the target area.

21. The program according to claim 20, wherein, in the determining procedure, a group of color areas estimated as a color bit code made of candidates of cells constructing a color bit code is regarded as a color bit code and decoded to obtain original data.

22. The program according to claim 21, wherein, in the determining procedure, when a plurality of groups of color areas estimated as color bit codes each made of candidates of cells constructing a color bit code exist, each of the area groups is regarded as a color bit code and decoded to obtain original data.

23. The program according to claim 19, wherein the space color indicating the quiet zone is white or black.

24. A non-transitory computer readable medium storing a program for making a computer operate as an optical recognition code recognizing apparatus for recognizing an optical recognition code, wherein the computer is made execute:
  a dividing procedure for dividing image data obtained by imaging an optical recognition code into color areas based on parameters indicative of colors; and
  a determining procedure for determining whether each of the divided color areas is a cell that is a component of the optical recognition code or not, wherein,
  in the determining procedure, when the number of cells constructing a 1D color bit code in the case where a target area is assumed to be a cell as a component of the 1D color bit code coincides with a predetermined number, it is determined that the target area is a candidate of a cell as a component of a color bit code.

25. A non-transitory computer readable medium storing a program for making a computer operate as an optical recognition code recognizing apparatus for recognizing an optical recognition code, wherein the computer is made execute:
  a dividing procedure for dividing image data obtained by imaging an optical recognition code into color areas based on parameters indicative of colors; and
  a determining procedure for determining whether each of the divided color areas is a cell that is a component of the optical recognition code or not, wherein,
  in the determining procedure, when a start point and an end point of a 1D color bit code are detected and one or more cells constructing the start point and one or more cells constructing the end point coincide with predetermined colors of the start and end points in the case where a target area is assumed to be a cell as a component of the 1D color bit code, it is determined that the target area is a candidate of a cell as a component of a color bit code.

26. A non-transitory computer readable medium storing a program for making a computer operate as an optical recognition code recognizing apparatus for recognizing an optical recognition code, wherein the computer is made execute:
  a dividing procedure for dividing image data obtained by imaging an optical recognition code into color areas based on parameters indicative of colors; and
  a determining procedure for determining whether each of the divided color areas is a cell that is a component of the optical recognition code or not, wherein,
  in the determining procedure, when an intermediate point of a 1D color bit code is detected and one or more cells constructing the intermediate point coincide with a predetermined color of the intermediate point in the case where a target area is assumed to be a cell as a component of the 1D color bit code, it is determined that the target area is a candidate of a cell as a component of a color bit code.

* * * * *